US012345057B2

(12) United States Patent
Telleria et al.

(10) Patent No.: US 12,345,057 B2
(45) Date of Patent: Jul. 1, 2025

(54) AUTOMATED DRYWALL PAINTING SYSTEM AND METHOD

(71) Applicant: Canvas Construction, Inc., San Francisco, CA (US)

(72) Inventors: Maria J. Telleria, Redwood City, CA (US); Gabriel F. Hein, Albany, CA (US); Kevin B. Albert, San Francisco, CA (US); Thomas F. Allen, Oakland, CA (US); Henrik Bennetsen, San Francisco, CA (US); Josephine Marie Pedersen, Martinez, CA (US); Jonathan B. Pompa, Long Beach, CA (US); Charlie Yan, San Francisco, CA (US); Alana G. R. Yoel, San Francisco, CA (US); Miles J. Flannery, San Francisco, CA (US); Henry Tonoyan, San Francisco, CA (US)

(73) Assignee: Canvas Construction, Inc., San Francisco, CA (US)

( * ) Notice: Subject to any disclaimer, the term of this patent is extended or adjusted under 35 U.S.C. 154(b) by 128 days.

(21) Appl. No.: 17/968,372

(22) Filed: Oct. 18, 2022

(65) Prior Publication Data
US 2023/0043189 A1 Feb. 9, 2023

Related U.S. Application Data

(63) Continuation of application No. 15/942,087, filed on Mar. 30, 2018, now Pat. No. 11,499,325.
(Continued)

(51) Int. Cl.
*E04F 21/02* (2006.01)
*B05B 1/28* (2006.01)
(Continued)

(52) U.S. Cl.
CPC .............. *E04F 21/026* (2013.01); *B05B 1/28* (2013.01); *B05B 7/0093* (2013.01); *B05B 9/007* (2013.01);
(Continued)

(58) Field of Classification Search
CPC ........................................................ B05D 1/02
See application file for complete search history.

(56) References Cited

U.S. PATENT DOCUMENTS

| 2,088,542 A | 7/1937 | Westin |
| 2,514,748 A | 7/1950 | Di Stefano |

(Continued)

FOREIGN PATENT DOCUMENTS

| CN | 1611331 A | 5/2005 |
| CN | 2883554 Y | 3/2007 |

(Continued)

OTHER PUBLICATIONS

Alex et al., "Automated Surface Profiling of Drywall Surface for Sanding," 28th International Symposium on Automation and Robotics in Construction, Jun. 2011, 7 pages.
(Continued)

*Primary Examiner* — Nathan T Leong
(74) *Attorney, Agent, or Firm* — Akona IP PC

(57) ABSTRACT

An automated painting system that includes a robotic arm and a painting end effector coupled at a distal end of the robotic arm, with the painting end effector configured to apply paint to a target surface. The painting system can also include a computing device executing a computational planner that: generates instructions for driving the painting end effector and robotic arm to perform at least one painting task that includes applying paint, via the painting the end effector, to a plurality of drywall pieces, the generating based at least in part on obtained target surface data; and drives the
(Continued)

end effector and robotic arm to perform the at least one painting task.

20 Claims, 20 Drawing Sheets

Related U.S. Application Data

(60) Provisional application No. 62/480,172, filed on Mar. 31, 2017.

(51) Int. Cl.

| | | |
|---|---|---|
| B05B 7/00 | (2006.01) | |
| B05B 9/00 | (2006.01) | |
| B05B 12/12 | (2006.01) | |
| B05B 13/04 | (2006.01) | |
| B05B 15/625 | (2018.01) | |
| B05C 5/00 | (2006.01) | |
| B05C 5/02 | (2006.01) | |
| B05C 11/10 | (2006.01) | |
| B05D 1/02 | (2006.01) | |
| B05D 3/04 | (2006.01) | |
| B05D 3/06 | (2006.01) | |
| B24B 7/18 | (2006.01) | |
| B24B 49/12 | (2006.01) | |
| B24B 55/06 | (2006.01) | |
| B24B 55/10 | (2006.01) | |
| B25J 9/16 | (2006.01) | |
| B25J 11/00 | (2006.01) | |
| B25J 15/00 | (2006.01) | |
| B26D 5/00 | (2006.01) | |
| E04B 1/76 | (2006.01) | |
| E04F 21/00 | (2006.01) | |
| E04F 21/08 | (2006.01) | |
| E04F 21/12 | (2006.01) | |
| E04F 21/16 | (2006.01) | |
| E04F 21/165 | (2006.01) | |
| E04F 21/18 | (2006.01) | |
| B05B 7/24 | (2006.01) | |
| B05B 7/26 | (2006.01) | |
| B05B 9/01 | (2006.01) | |
| B05B 14/00 | (2018.01) | |
| B05C 3/18 | (2006.01) | |
| B25J 9/00 | (2006.01) | |
| B26D 3/08 | (2006.01) | |

(52) U.S. Cl.
CPC ........ *B05B 12/122* (2013.01); *B05B 13/0431* (2013.01); *B05B 15/625* (2018.02); *B05C 5/004* (2013.01); *B05C 5/02* (2013.01); *B05C 11/1039* (2013.01); *B05D 1/02* (2013.01); *B05D 3/0413* (2013.01); *B05D 3/067* (2013.01); *B24B 7/182* (2013.01); *B24B 49/12* (2013.01); *B24B 55/06* (2013.01); *B24B 55/10* (2013.01); *B25J 9/1661* (2013.01); *B25J 9/1697* (2013.01); *B25J 11/0055* (2013.01); *B25J 11/0075* (2013.01); *B25J 15/0019* (2013.01); *B26D 5/007* (2013.01); *E04B 1/7654* (2013.01); *E04F 21/0046* (2013.01); *E04F 21/08* (2013.01); *E04F 21/085* (2013.01); *E04F 21/12* (2013.01); *E04F 21/16* (2013.01); *E04F 21/165* (2013.01); *E04F 21/1652* (2013.01); *E04F 21/1657* (2013.01); *E04F 21/18* (2013.01); *B05B 7/24* (2013.01); *B05B 7/26* (2013.01); *B05B 9/01* (2013.01); *B05B 14/00* (2018.02); *B05C 3/18* (2013.01); *B25J 9/0084* (2013.01); *B26D 3/085* (2013.01); *G05B 2219/40114* (2013.01); *G05B 2219/40298* (2013.01); *Y10S 901/01* (2013.01); *Y10S 901/41* (2013.01); *Y10S 901/43* (2013.01); *Y10S 901/47* (2013.01)

(56) References Cited

U.S. PATENT DOCUMENTS

| | | |
|---|---|---|
| 3,116,882 A | 1/1964 | Vork |
| 4,392,336 A | 7/1983 | Ganssle |
| 4,941,182 A | 7/1990 | Patel |
| 5,175,018 A | 12/1992 | Lee et al. |
| 5,279,700 A | 1/1994 | Retti |
| 5,429,682 A * | 7/1995 | Harlow, Jr. ........ G05B 19/4182 118/712 |
| 5,670,202 A | 9/1997 | Guzowski et al. |
| 5,979,520 A | 11/1999 | Behrendt |
| 5,987,591 A | 11/1999 | Jyumonji |
| 6,112,490 A | 9/2000 | Meyer |
| 6,149,506 A | 11/2000 | Duescher |
| 6,712,238 B1 | 3/2004 | Mills |
| 7,551,058 B1 | 6/2009 | Johnson et al. |
| 9,243,412 B1 | 1/2016 | Gallette et al. |
| 9,427,874 B1 | 8/2016 | Rublee |
| 9,518,870 B2 | 12/2016 | Verdino |
| 9,527,211 B2 | 12/2016 | Posselius et al. |
| 9,637,936 B1 | 5/2017 | Gallette et al. |
| 9,694,381 B2 | 7/2017 | Mohr |
| 9,702,830 B1 | 7/2017 | Akselrod et al. |
| 9,849,594 B2 | 12/2017 | Keese |
| 9,995,047 B2 | 6/2018 | Raman et al. |
| 10,478,972 B2 | 11/2019 | Lipinski et al. |
| 10,513,856 B2 | 12/2019 | Telleria et al. |
| 10,526,799 B2 | 1/2020 | Telleria et al. |
| 10,697,188 B2 | 6/2020 | Telleria et al. |
| 10,718,119 B2 | 7/2020 | Telleria et al. |
| 10,822,814 B2 | 11/2020 | Telleria et al. |
| 10,870,996 B2 | 12/2020 | Telleria et al. |
| 11,059,065 B2 | 7/2021 | Holloway et al. |
| 11,077,457 B2 | 8/2021 | Lipinski et al. |
| 11,230,008 B2 | 1/2022 | Schweigler |
| 2004/0159724 A1 | 8/2004 | van der Steur |
| 2005/0064804 A1 | 3/2005 | Cecil et al. |
| 2005/0120840 A1 | 6/2005 | Koskovich |
| 2006/0108450 A1 | 5/2006 | Klinkenberg et al. |
| 2007/0000947 A1 | 1/2007 | Lewis et al. |
| 2007/0107632 A1 | 5/2007 | Ball |
| 2007/0151201 A1 | 7/2007 | Fellinger |
| 2008/0168741 A1 | 7/2008 | Gilgan et al. |
| 2009/0199690 A1 | 8/2009 | Sun et al. |
| 2010/0010660 A1 | 1/2010 | Salour et al. |
| 2010/0098871 A1 | 4/2010 | Gale et al. |
| 2010/0307279 A1 | 12/2010 | Campagna et al. |
| 2011/0011222 A1 | 1/2011 | Bales |
| 2011/0211938 A1 | 9/2011 | Eakins et al. |
| 2011/0253291 A1* | 10/2011 | Allen .................... C04B 28/14 156/154 |
| 2011/0302877 A1 | 12/2011 | Gilgan et al. |
| 2012/0219699 A1 | 8/2012 | Pettersson et al. |
| 2012/0316930 A1 | 12/2012 | Clemenson |
| 2013/0042480 A1 | 2/2013 | Turulin |
| 2013/0167471 A1 | 7/2013 | Denaro |
| 2013/0239498 A1 | 9/2013 | Owens |
| 2013/0260016 A1 | 10/2013 | Georgeson et al. |
| 2014/0022281 A1 | 1/2014 | Georgeson et al. |
| 2014/0230726 A1 | 8/2014 | Gale et al. |
| 2014/0336818 A1 | 11/2014 | Posselius et al. |
| 2015/0112482 A1 | 4/2015 | Kuwahara |
| 2015/0147460 A1 | 5/2015 | Manzi et al. |
| 2015/0336267 A1 | 11/2015 | Sun et al. |
| 2015/0350618 A1 | 12/2015 | Meier et al. |
| 2015/0375390 A1 | 12/2015 | Becroft et al. |
| 2016/0052012 A1 | 2/2016 | Mohr |
| 2016/0121486 A1* | 5/2016 | Lipinski .............. B05B 13/0431 427/427.3 |
| 2016/0207220 A1 | 7/2016 | Hack et al. |

(56) References Cited

U.S. PATENT DOCUMENTS

| | | |
|---|---|---|
| 2016/0313294 A1 | 10/2016 | Dattilo et al. |
| 2017/0052507 A1 | 2/2017 | Poulos et al. |
| 2018/0009000 A1 | 1/2018 | Shang et al. |
| 2018/0021799 A1 | 1/2018 | Raman et al. |
| 2018/0223546 A1 | 8/2018 | Wasserfaller, Sr. |
| 2018/0281012 A1 | 10/2018 | Telleria et al. |
| 2018/0283018 A1 | 10/2018 | Telleria et al. |
| 2019/0118209 A1 | 4/2019 | Rennuit |
| 2019/0255551 A1 | 8/2019 | Hargadon |
| 2020/0061866 A1 | 2/2020 | Giles |

FOREIGN PATENT DOCUMENTS

| | | |
|---|---|---|
| CN | 202023345 U | 11/2011 |
| CN | 105971253 A | 9/2016 |
| CN | 106088544 A | 11/2016 |
| DE | 102006056179 A1 | 6/2008 |
| GB | 2171222 A | 8/1986 |
| IT | MO20100102 A1 | 10/2011 |
| JP | H03100265 A | 4/1991 |
| JP | H04169659 A | 6/1992 |
| JP | H04258468 A | 9/1992 |
| JP | H06269709 A | 9/1994 |
| JP | H0766585 A | 3/1995 |
| JP | 2645312 B2 | 8/1997 |
| JP | H10180178 A | 7/1998 |
| JP | 2010203055 A | 9/2010 |
| JP | 5107123 B2 | 12/2012 |
| JP | 2017109294 A | 6/2017 |
| JP | 2019167678 A | 10/2019 |
| JP | 6713762 B2 | 6/2020 |
| KR | 20090085809 A | 8/2009 |
| KR | 101131918 B1 | 4/2012 |
| RU | 1789711 C | 1/1993 |
| RU | 2100686 C1 | 12/1997 |
| RU | 2686421 C1 | 4/2019 |
| SU | 00160667 | 11/1963 |
| WO | 2007141320 A1 | 12/2007 |
| WO | 2013000524 A1 | 1/2013 |
| WO | 2016200439 A1 | 12/2016 |
| WO | 2017187105 A1 | 11/2017 |
| WO | 2018183961 A1 | 10/2018 |
| WO | 2018226533 A1 | 12/2018 |

OTHER PUBLICATIONS

Bao et al., "Flexible Pneumatic End-effector for Agricultural Robot: Design & Experiment," Proceedings of the 2015 IEEE Conference on Robotics and Biomimetics, Dec. 6, 2015, 6 pages.
FANUC America Corporation, "Robotic Sanding, Washing & Drying An Aircraft Fuselage with FANUC's New P-350iA/45 Robot," Oct. 27, 2016, retrieved from https://www.youtube.com/watch?v=abA9v8EOokl, 4 pages.
Forsberg et al., "A Construction Robot for Autonomous Plastering of Walls and Ceilings," Jun. 11, 1997, retrieved Aug. 8, 2019, from http://www.iaarc.org/publications/fulltext/A_construction_robot_for_autonomous_plastering_of_walls_and_ceilings.PDF, 9 pages.
International Search Report and Written Opinion mailed Aug. 2, 2018, International Patent Application No. PCT/US2018/025570, filed Mar. 30, 2018, 7 pages.
International Search Report and Written Opinion mailed Feb. 28, 2019, International Patent Application No. PCT/US2018/052751, filed Sep. 25, 2018, 7 pages.
International Search Report and Written Opinion mailed Jul. 5, 2018, International Patent Application No. PCT/US2018/025529, filed Mar. 30, 2018, 7 pages.
International Search Report and Written Opinion mailed Jul. 5, 2018, International Patent Application No. PCT/US2018/025536, filed Mar. 30, 2018, 7 pages.
International Search Report and Written Opinion mailed Jul. 5, 2018, International Patent Application No. PCT/US2018/025553, filed Mar. 30, 2018, 7 pages.
International Search Report and Written Opinion mailed Jul. 5, 2018, International Patent Application No. PCT/US2018/025556, filed Mar. 30, 2018, 7 pages.
International Search Report and Written Opinion mailed Jul. 5, 2018, International Patent Application No. PCT/US2018/025566, filed Mar. 30, 2018, 7 pages.
International Search Report and Written Opinion mailed May 28, 2020, in International Patent Application No. PCT/US2020/019347, filed Feb. 21, 2020, 9 pages.
Jahangiri, "Generating Optimized Cutting Layours of Drywall Panels Using Building Information," Master of Science Thesis Texas A&M University, May 2016, 68 pages.
Jeremy56 et al., "Cannot get my drywall into the basement," DIYChatroom.com, https://www.diychatroom.com/threads/cannot-get-my-drywall-into-the-basement.7454/, Mar. 30, 2007, 9 pages.
Krieg, "HygroSkin—Meteorosensitive Pavilion," Fabricate 2014: Negotiating Design and Making, Feb. 2014, https://www.researchgate.net/publication/273060832_HygroSkin_-_Meteorosensitive_Pavilion, 9 pages.
Nagata et al., "Robotic sanding system for new designed furniture with free-formed surface," Robotics and Computer-Integrated Manufacturing 23(4):371-379, Aug. 2007.
Pelletier, "Carpet Seam Peaking", PelletierRug.com, https://www.pelletierrug.com/carpet-seam-peaking.php, 2012, 2 pages.
Supplementary European Search Report issued in EP Patent Application No. 18774804.1, mailed Dec. 4, 2020, 6 pages.
Supplementary European Search Report issued in EP Patent Application No. 18776196.0, mailed Dec. 9, 2020, 8 pages.
Supplementary European Search Report issued in EP Patent Application No. 18777789.1, mailed Dec. 8, 2020, 9 pages.
Supplementary European Search Report issued in EP Patent Application No. 20760348.1, mailed Sep. 19, 2022, 10 pages.
Tuberville Enterprizes, "Walls & Ceilings Joint Compund Additive," Jun. 5, 2012, retrieved Aug. 8, 2019, from https://www.wconline.com/articles/88003-joint-compound-additive, 1 page.
Ueno et al., "Construction Robots for Site Automation," CAD & Robotocs in Architecture & Construction, 1986, 13 pages.
Unknown, "Method of Tuning Parameters for Compliant Motion Tasks in Robot Programming", IBM Technical Disclosure Bulletin, Mar. 1, 1992, 3 pages.
Yoshida et al., "Development of Spray Robot for Fireproof Cover Work," 1984, 27 pages.
Krieg, "HygroSkin—Meteorosensitive Pavilion," Fabricate 2014: Negotiating Design and Making, Feb. 2014, https://researchgate.net/publication/273060832_HygroSkin_-_Meteorosensitive_Pavilion, 9 pages.
U.S. Appl. No. 15/942,158, filed Mar. 30, 2018, now issued U.S. Pat. No. 10,513,856.
U.S. Appl. No. 15/942,193, filed Mar. 30, 2018, now issued U.S. Pat. No. 10,526,799.
U.S. Appl. No. 15/941,886, filed Mar. 30, 2018, now issued U.S. Pat. No. 10,822,814.
U.S. Appl. No. 15/942,318, filed Mar. 30, 2018, now issued U.S. Pat. No. 10,718,119.
U.S. Appl. No. 15/942,286, filed Mar. 30, 2018, now issued U.S. Pat. No. 10,697,188.
U.S. Appl. No. 15/941,974, filed Mar. 30, 2018, now issued U.S. Pat. No. 10,870,996.

\* cited by examiner

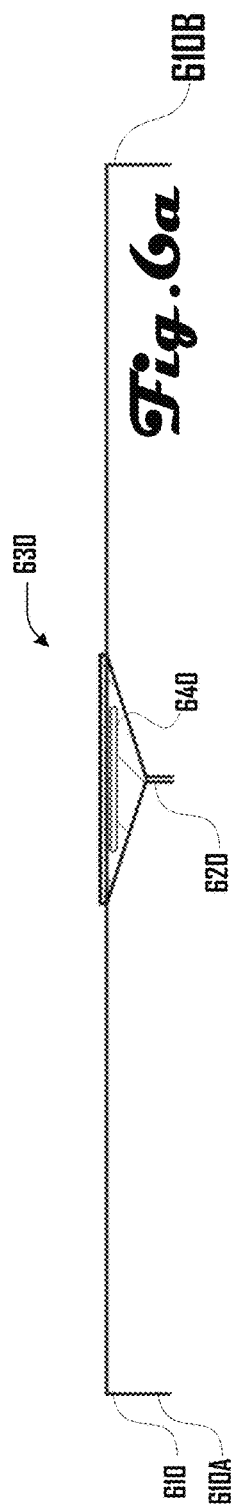
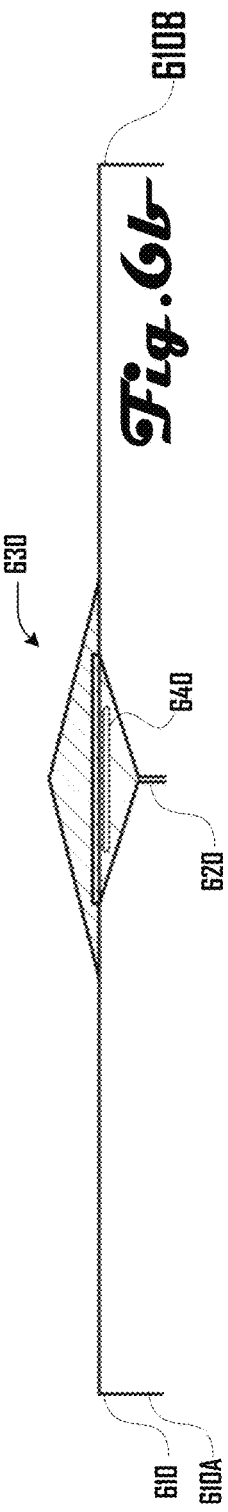
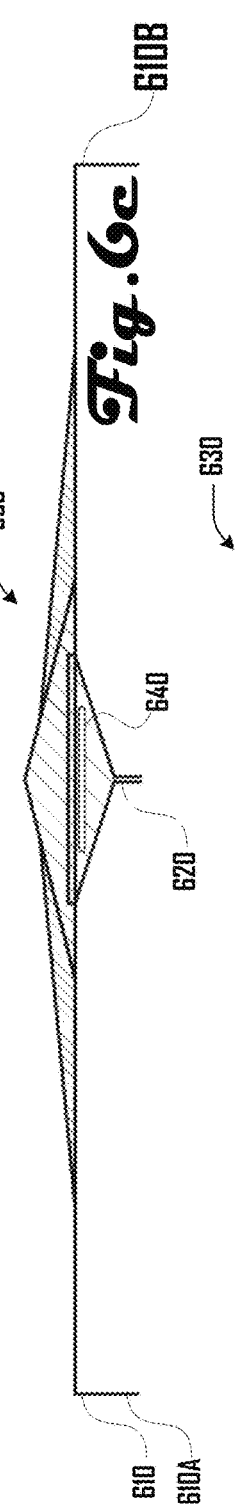
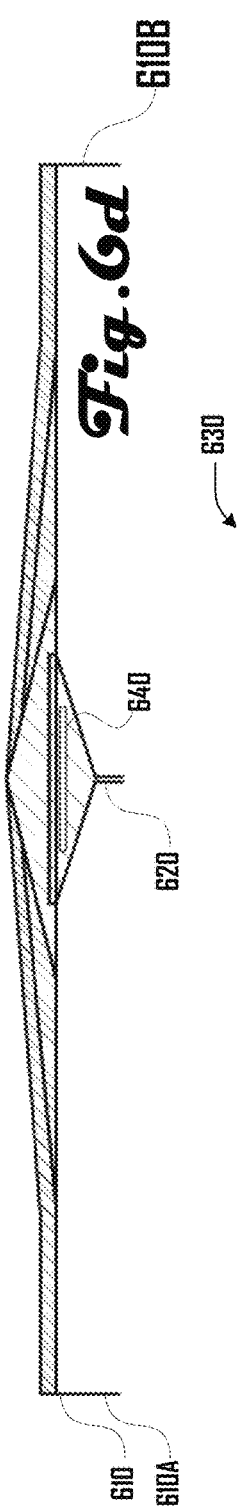
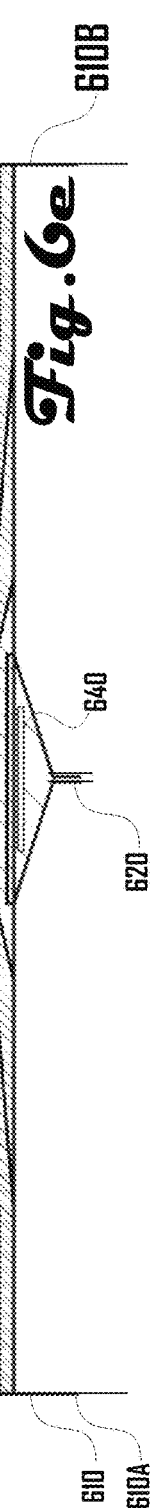

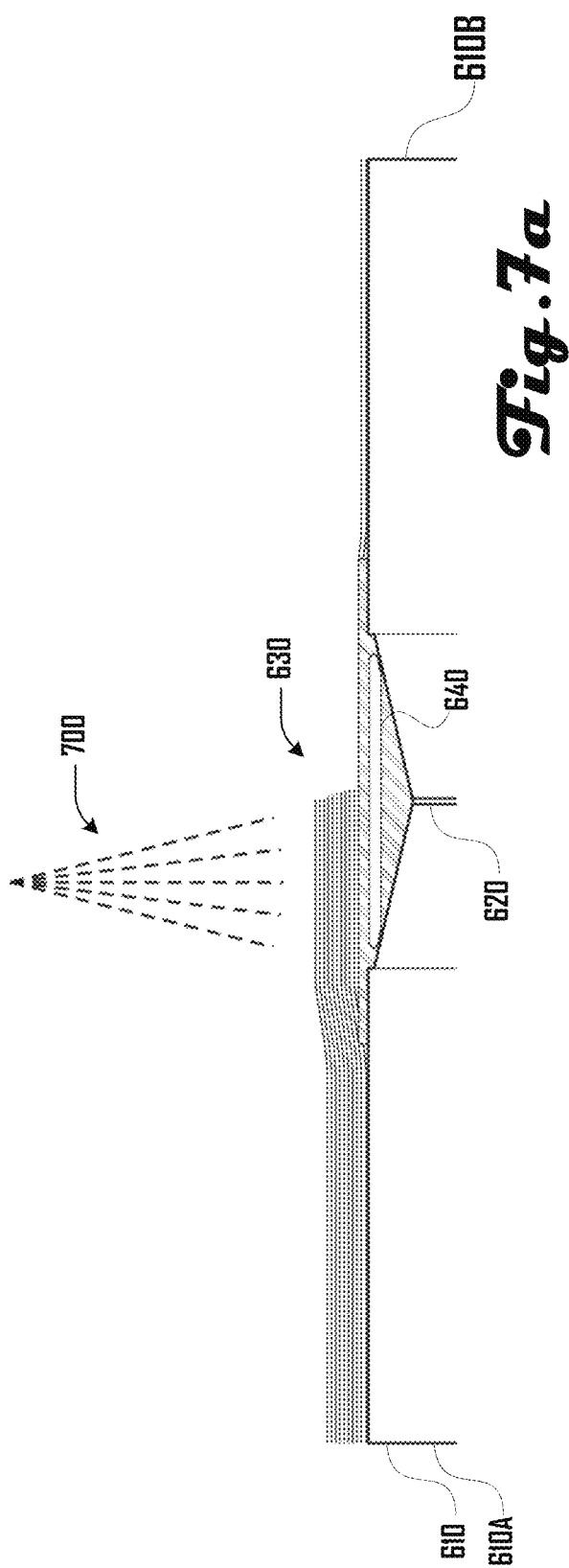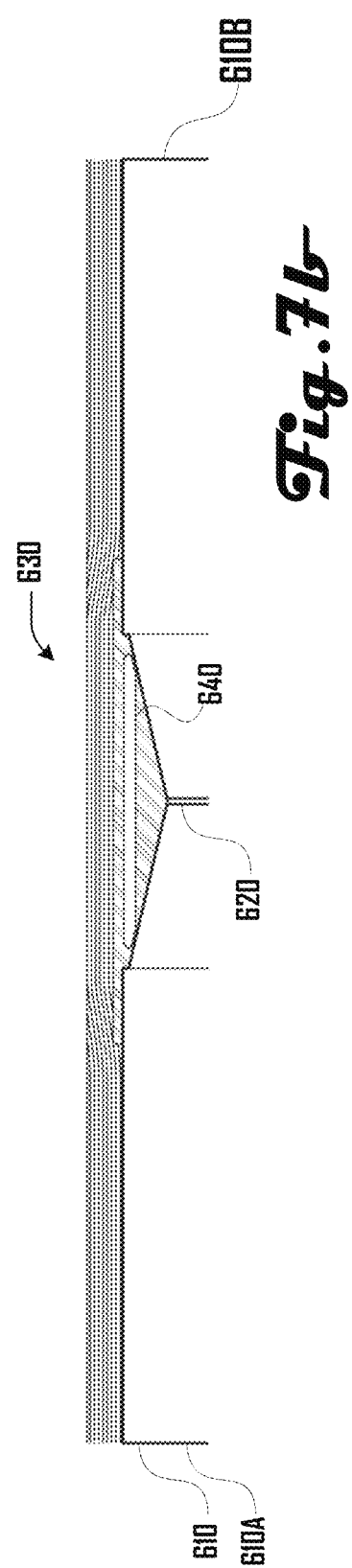

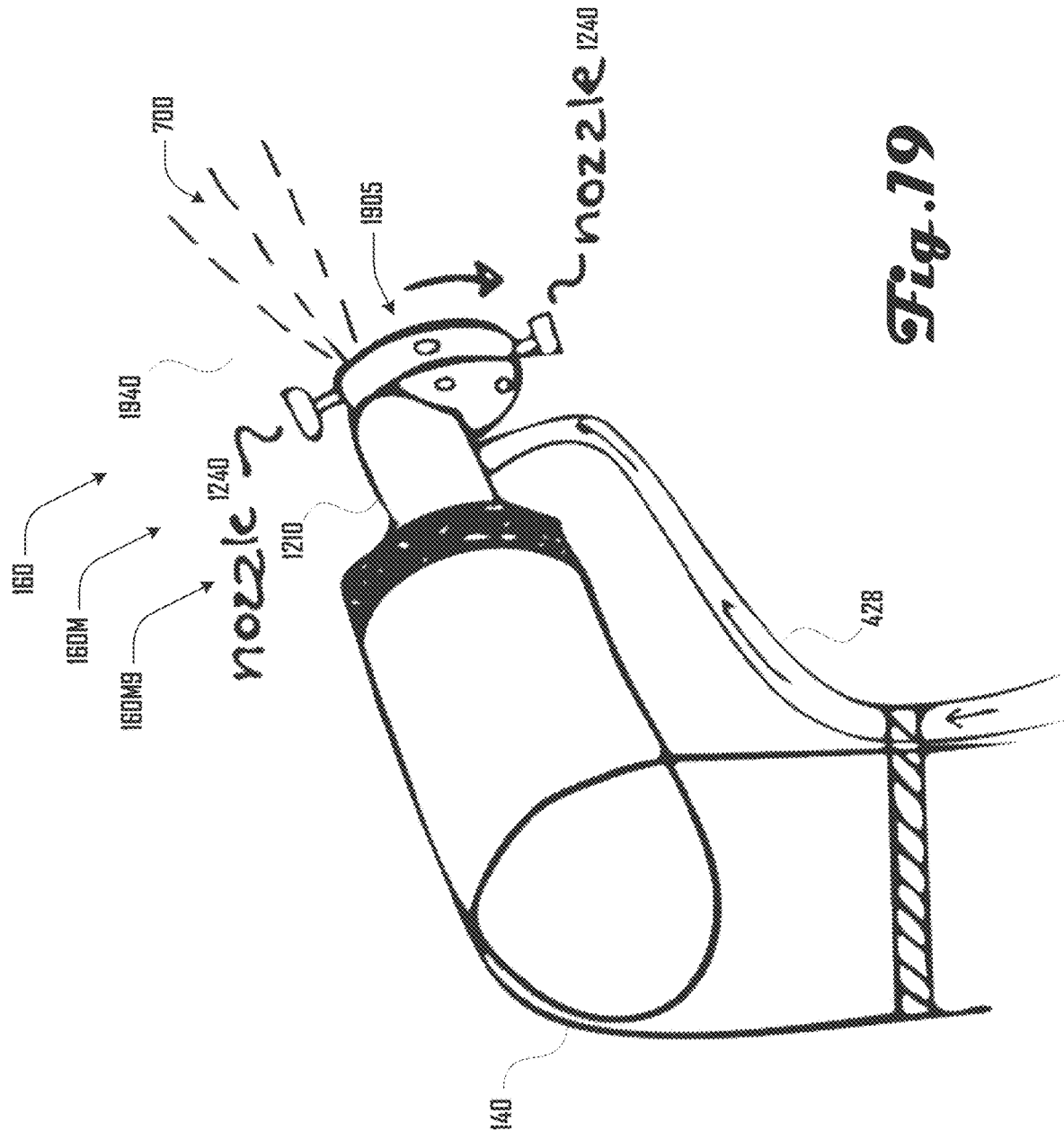

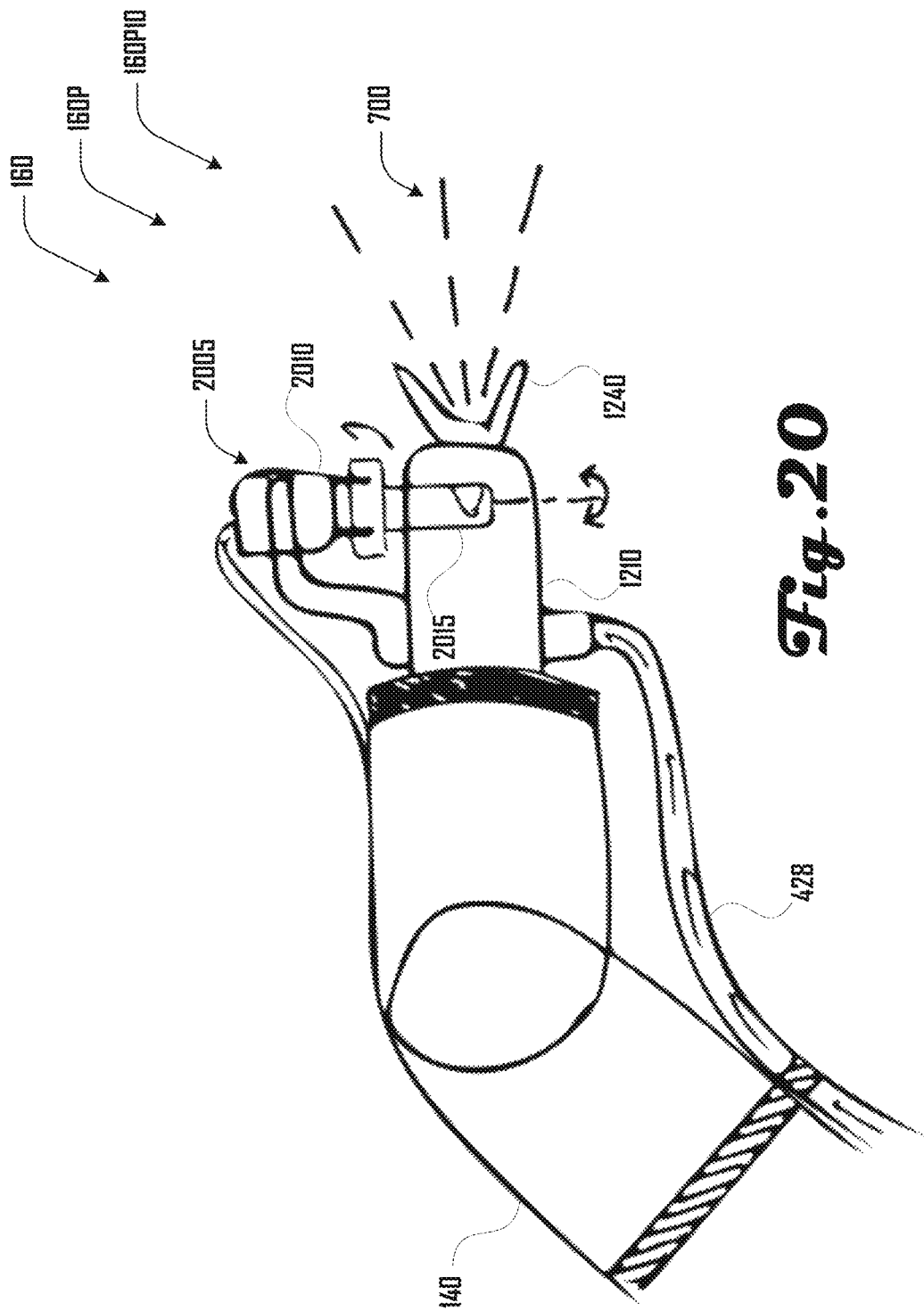

AUTOMATED DRYWALL PAINTING SYSTEM AND METHOD

CROSS-REFERENCE TO RELATED APPLICATIONS

This application is a continuation of U.S. application Ser. No. 15/942,087, filed Mar. 30, 2018, which is a nonprovisional of, and claims the benefit of U.S. Provisional Application No. 62/480,172, filed Mar. 31, 2017, which applications are hereby incorporated herein by reference in their entirety and for all purposes.

This application is also related to U.S. Non-provisional applications filed contemporaneously herewith having application Ser. Nos. 15/942,158, 15/942,193, 15/941,886, 15/942,318, 15/942,286, and 15/941,974 and respectively entitled "AUTOMATED DRYWALL PLANNING SYSTEM AND METHOD," "AUTOMATED DRYWALL CUTTING AND HANGING SYSTEM AND METHOD," "AUTOMATED DRYWALL MUDDING SYSTEM AND METHOD," "AUTOMATED DRYWALL SANDING SYSTEM AND METHOD," "AUTOMATED DRYWALLING SYSTEM AND METHOD," and "AUTOMATED INSULATION APPLICATION SYSTEM AND METHOD." These applications are hereby incorporated herein by reference in their entirety and for all purposes.

BRIEF DESCRIPTION OF THE DRAWINGS

FIGS. 6a, 6b, 6c, 6d and 6e illustrate an embodiment of a manual mud application profile, where joint compound is applied over consecutive layers to taper out high points over a wider area and where sanding is then used to smooth out the final profile.

FIGS. 7a and 7b illustrate an embodiment of an automated compound application process where the joint compound is applied in a thick layer using a sprayer.

FIG. 15 illustrates an example embodiment of a painting end effector that includes a spray pattern detection mechanism, in which a vision system can be used to monitor the pattern of paint spray coming out of the nozzle to detect clogs, nozzle wear, low pressure, or other problems with the spray gun or related system such as paint lines, paint source, or the like.

FIG. 19 illustrates an example embodiment of a painting end effector, which comprises a nozzle cassette system where a cassette of nozzles is attached to the end of the spray gun.

FIG. 20 illustrates another example embodiment of a painting end effector that comprises a nozzle rotating system that can be part of a spray gun.

Figure 1:
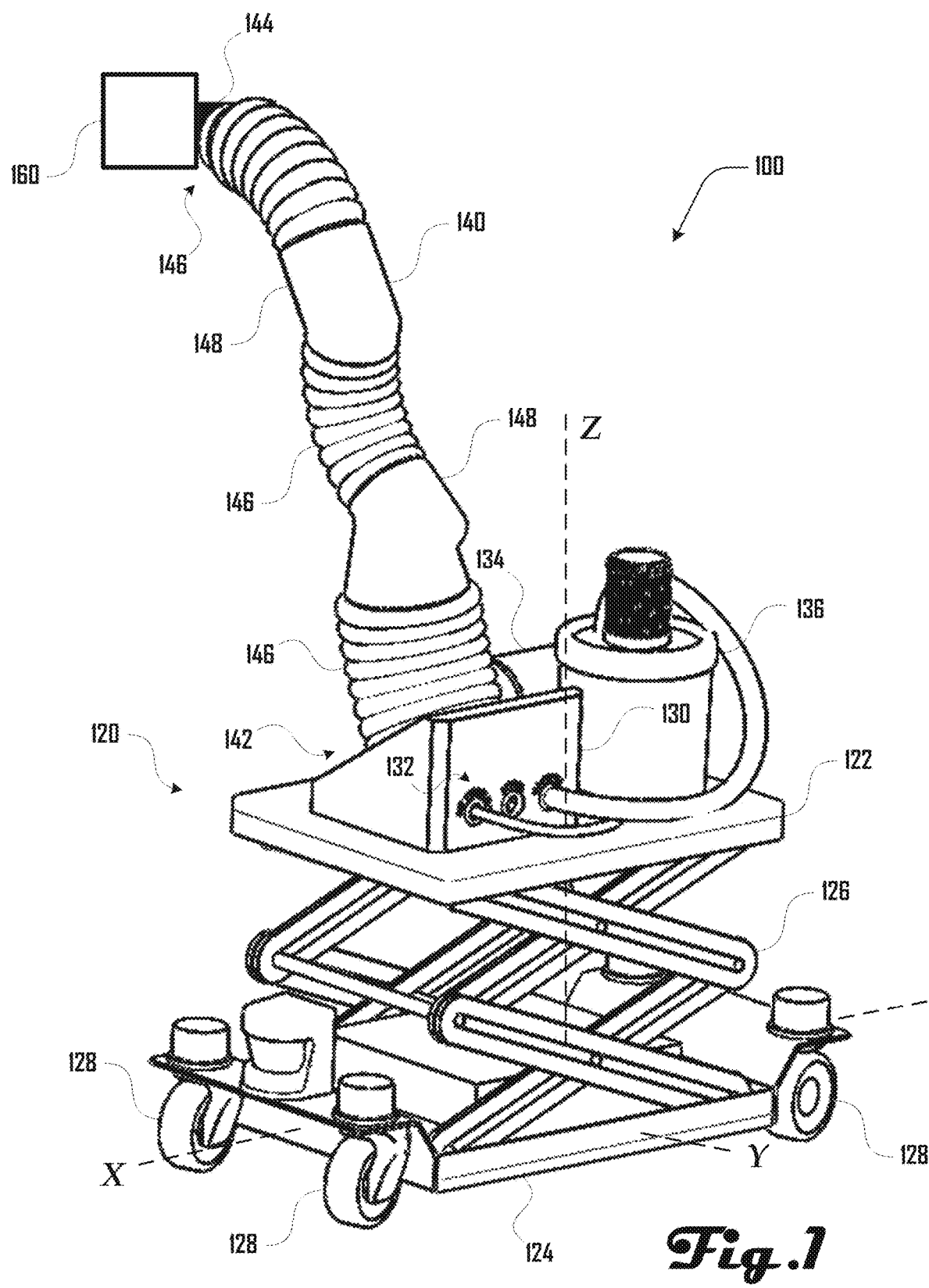
FIG. 1 is an exemplary perspective drawing illustrating an embodiment of an automated drywall installation system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure pertains to an automated drywalling system, which in some embodiments can be used for drywalling, including one or more of planning a configuration and location of drywall pieces on a wall assembly, cutting drywall pieces, hanging drywall pies, performing mud work on hung drywall pieces, performing sanding on mudded drywall pieces and painting sanded drywall pieces.

In one aspect, the present disclosure pertains to an automatic systems and methods for painting and applying protective coatings onto a substrate. For example, in one embodiment the system can be used to mix, deliver, apply, and/or dry paint on drywall boards. In another embodiment the system can used to apply wallpaper on drywall boards. Although examples herein may discuss paint, the system can also be used with any other suitable coatings including varnishes, films, polymer coatings, and the like, which can be applied onto any suitable substrate including drywall, wood, metal, polymers, or the like. The system can be configured for handling how such a coating is prepared, how it is delivered onto the substrate and how it is set, cured or dried.

Figure 2:
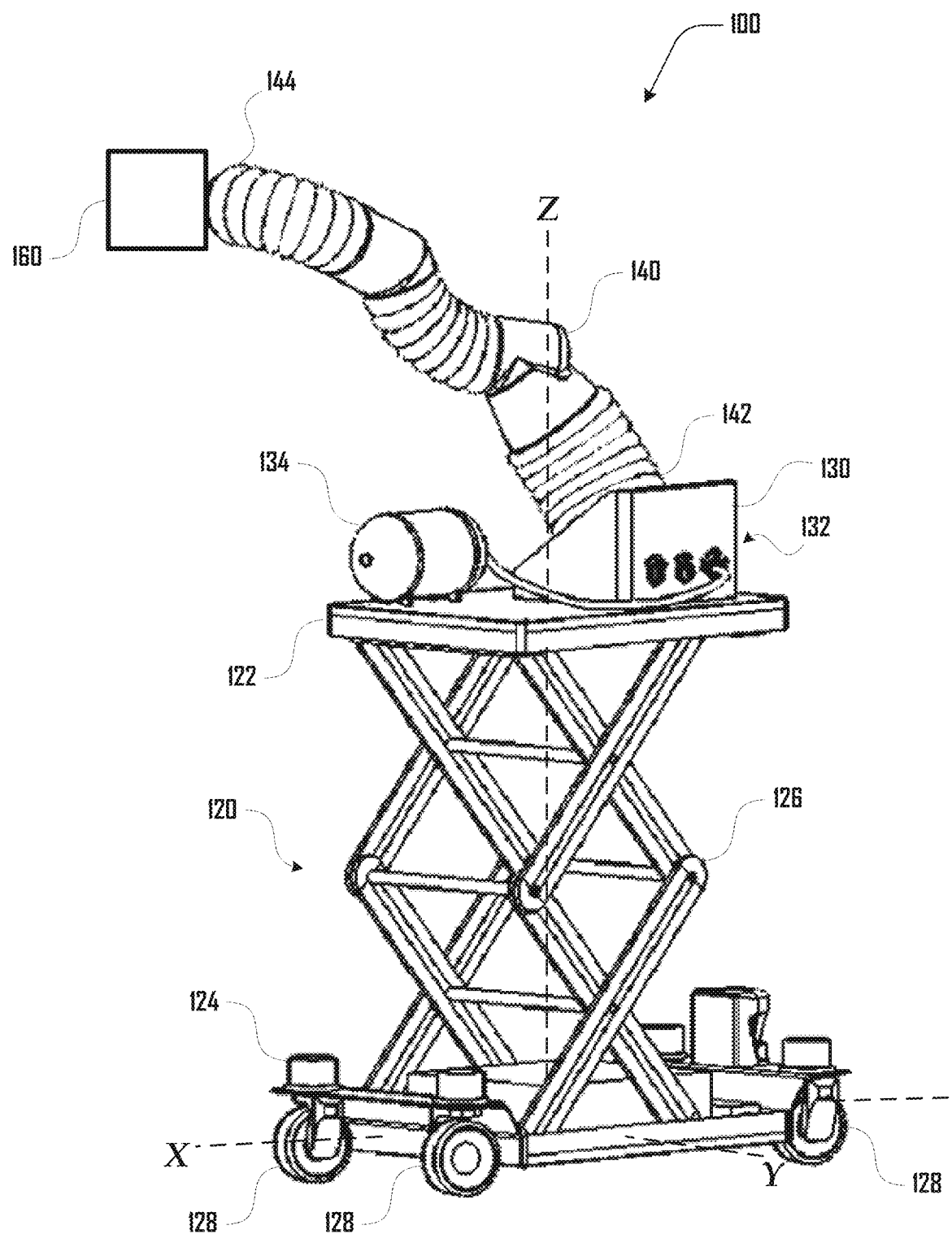
FIG. 2 is an exemplary perspective drawing illustrating another embodiment of an automated drywalling system.

Turning to FIGS. 1 and 2, examples of an automated drywalling system 100 are illustrated, which includes a base unit 120, a robotic arm 140 and an end effector 160. The base unit 120 comprises a platform 122 and a cart 124 with a lift 126 disposed between the platform 122 and cart 124. The cart 124 can be configured to be disposed on the ground and move within an XY plane defined by axes X and Y, and the lift 126 can be configured to raise the platform 122 up and down along axis Z, which is perpendicular to axes X and Y.

In the examples of FIGS. 1 and 2, the cart 124 can comprise a plurality of wheels 128, which can be used to move the cart 124 and drywalling system 100 on the ground in the XY plane. Such movement can be motorized or non-motorized. For example, in some embodiments, the drywalling system 100 can be configured for automated movement of the cart 124, motorized movement based on input from a user and/or non-motorized movement based on physical movement by a user. Additionally, while an example having wheels 128 is shown in some examples herein, it should be clear that the cart 124 can be configured for motorized and/or non-motorized movement via any suitable structures, systems, or the like.

In the examples of FIGS. 1 and 2, the lift 126 is shown comprising a scissor lift that can raise and lower the platform 122 relative to the cart 124 along axis Z. Such movement can be motorized or can be non-motorized. For example, in some embodiments, the drywalling system 100 can be configured for automated movement of the lift 126, motorized movement of the lift 126 based on input from a user and/or non-motorized movement based on physical operation of the lift 126 by a user. Additionally, while an example of a scissor lift is shown herein, it should be clear that any suitable lift system can comprise the lift 126 without limitation.

The platform 122 can comprise a hub 130, which can couple with the robotic arm 140 at a base end 142 of the robotic arm 140. The hub 130 can comprise an input interface 132 that allows for various systems to couple with the hub 130, which can allow for resources provided by such systems to be provided to the robotic arm 140 and/or the end effector 160 coupled at a distal end 144 of the robotic arm 140 as discussed in more detail herein. For example, a pneumatic source, a power source, a vacuum source, a paint source, a mud or joint compound source, or the like can be coupled to the hub 130. FIG. 1 illustrates an example having an air compressor 134 and a vacuum source 136 coupled to the hub 130. FIG. 2 illustrates an example having an air compressor 134 coupled to the hub 130, which can be used to power pneumatic actuators 146 of the robotic arm 140 and/or provide compressed air to the end effector 160 at the distal end 144 of the robotic arm 140.

In various embodiments, the robotic arm 140 can comprise any suitable robotic arm system, which can include pneumatic actuators, electric actuators, and the like. The robotic arm 140 can have any suitable number of degrees of freedom. Although the examples of FIGS. 1 and 2 illustrate an example having pneumatic actuator units 146 separated by arm couplers 148, this example configuration should not be construed to be limiting on the wide variety of robotic arms 140 that are within the scope and spirit of the present disclosure.

As discussed in more detail herein, an end effector 160 can be coupled at the distal end 144 of the robotic arm 140. In some examples, the automated drywalling system 100 can comprise modular and/or multi-use end effectors 160, which can be configured for various drywalling, construction, or other tasks. For example, as discussed herein, end effectors 160 can be configured for drywall planning, drywall hanging, applying mud or joint compound to hung drywall, sanding mudded drywall, painting, and the like. Although various examples herein relate to drywalling and construction, further embodiments of the drywalling system 100 can be configured for any suitable tasks, including construction tasks, manufacturing tasks, gardening tasks, farming tasks, domestic tasks, and the like. Accordingly, the discussions herein related to drywalling and construction should not be construed to be limiting on the wide variety of tasks that the system 100 can be configured for.

Figure 3:
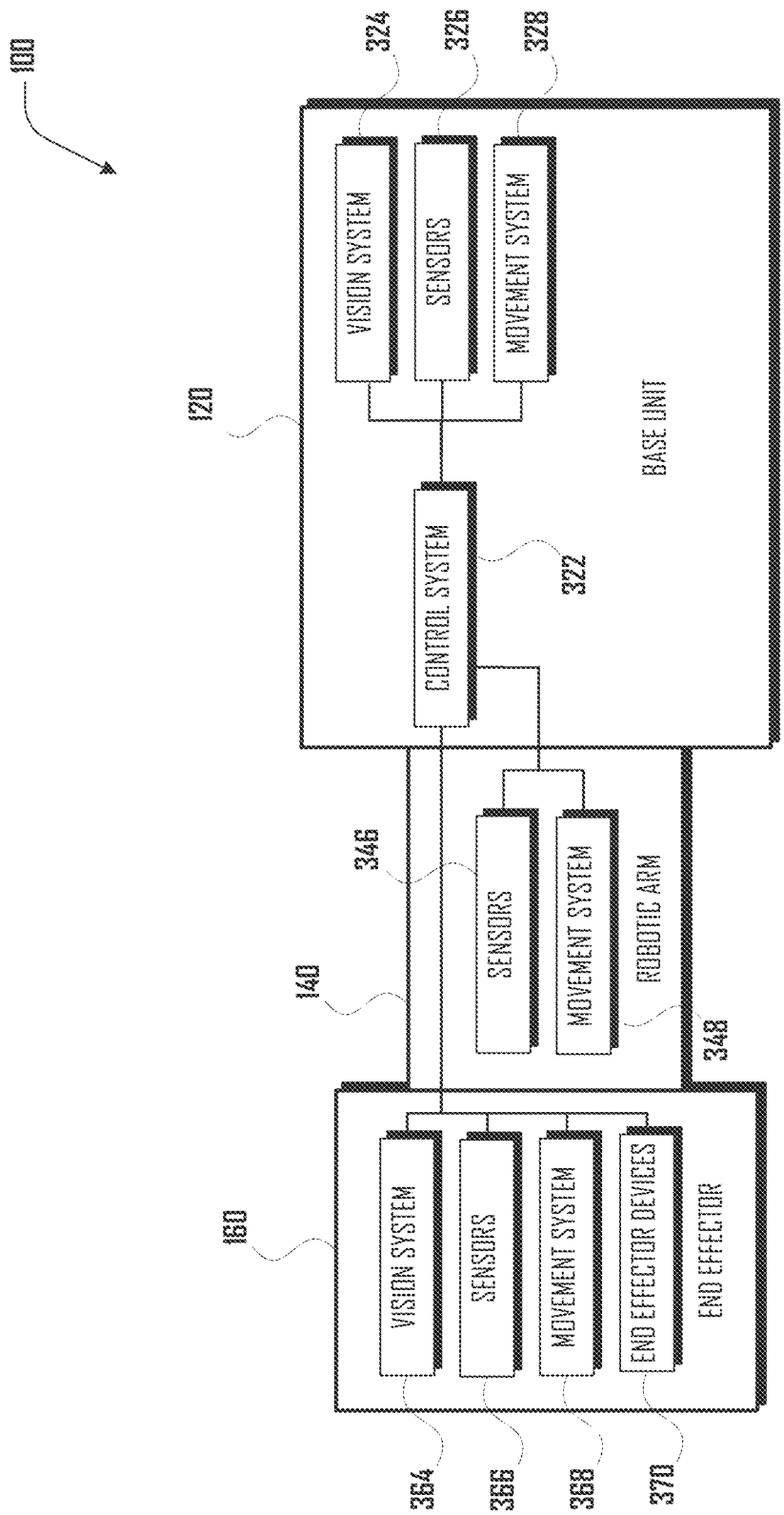
FIG. 3 is an exemplary block diagram illustrating systems of an automated drywalling system in accordance with one embodiment.

Turning to FIG. 3, a block diagram of a drywalling system 100 is illustrated, which includes a base unit 120 coupled to a robotic arm 140, which is coupled to an end effector 160. The base unit 120 is shown comprising a control system 322, which is operably coupled to a vision system 324, sensors 326, and a movement system 328. The robotic arm 140 is shown comprising sensors 346 and a movement system 348, which are operably coupled to the control system 322. The example end effector 160 is shown comprising a vision system 364, sensors 366, a movement system 368, and one or more end effector devices 370, which are operably connected to the control system 322.

In various embodiments, the connections between the control system 322 and respective vision systems 324, 364; respective sensors 326, 346, 366; respective movement systems 328, 348, 368; and end effector devices 370 can comprise any suitable type of connection including wired and/or wireless connections. For example, such connections can be configured for digital and/or analog communication of information between respective elements.

The vision systems 324, 364 can comprise one or more suitable vision systems including one or more visible spectrum camera, radar, light detection and ranging (LIDAR) system, sonar, infrared camera, thermal camera, stereo cameras, structured light camera, laser scanners, and the like. The vision systems 324, 364 can comprise the same or different elements. Additionally, in some embodiments, one or both of the vision systems 324, 364 can be absent. In some embodiments, the robotic arm 140 can comprise a vision system.

The sensors 326, 346, 366 can comprise any suitable sensors in various embodiments including one or more sensors of humidity, temperature, air flow, laser curtains, proximity sensors, force and torque sensors, pressure sensors, limit switches, rotameter, spring and piston flow meters, ultrasonic flow meters, turbine meters, paddlewheel meters, variable area meters, positive displacement, vortex meters, pitot tube or differential pressure meters, magnetic meters, humidity sensors, conductivity sensors, and depth or thickness sensors. The sensors 326, 346, 366 can comprise the same or different elements. Additionally, in some embodiments, one or more of the sensors 326, 346, 366 can be absent.

The movement systems 328, 348, 368 can comprise any suitable movement systems in various embodiments including one or more of an electric motor, pneumatic actuators, piezo electric actuator, and the like. For example, in some embodiments the movement system 328 of the base unit 120 can comprise the lift 126 and motors that drive wheels 128 of the cart 124 (see FIGS. 1 and 2). In another example, the movement system 348 of the robotic arm 140 can comprise pneumatic actuators 146 as illustrated in the examples of FIGS. 1 and 2. In various embodiments, the movement system 368 of the end effector 160 can comprise motors or other systems that are configured to move, change the orientation of, rotate, or otherwise configure the end effector 160. In some embodiments, one or more of the movement systems 328, 348, 368 can be absent.

As discussed herein, the one or more end effector devices 370 can comprise various suitable devices, including a cutting device, hanging device, mudding device, sanding device, painting device, vacuum device, and the like. Other suitable devices can be part of an end effector 160 and can be selected based on any desired task that the end effector 160 can be used for.

As discussed in more detail herein, the control system 322 can receive data from the vision systems 324, 364 and/or sensors 326, 346, 366 can drive the movement systems 328, 348, 368 and one or more end effector devices 370 to perform various tasks including drywall planning, drywall hanging, applying mud or joint compound to hung drywall, sanding mudded drywall, painting, and the like. Accordingly, the control system 322 can drive the drywalling system 100 to perform various suitable tasks, with some or all portions of such tasks being automated and performed with or without user interaction. The control system can comprise various suitable computing systems, including one or more processor and one or more memory storing instructions that if executed by the one or more processors, provide for the execution of tasks by the automated drywalling system 100 as discussed in detail herein. Additionally, while a control system 322 is shown as being part of the base unit 120, in further embodiments, the control system can be part of the robotic arm 140 or end effector 160. Also, further examples can include a plurality of control systems and/or control sub-systems, which can be suitably disposed in one or more of the base units 120, robotic arm 140, and/or end effector 160.

Figure 4:
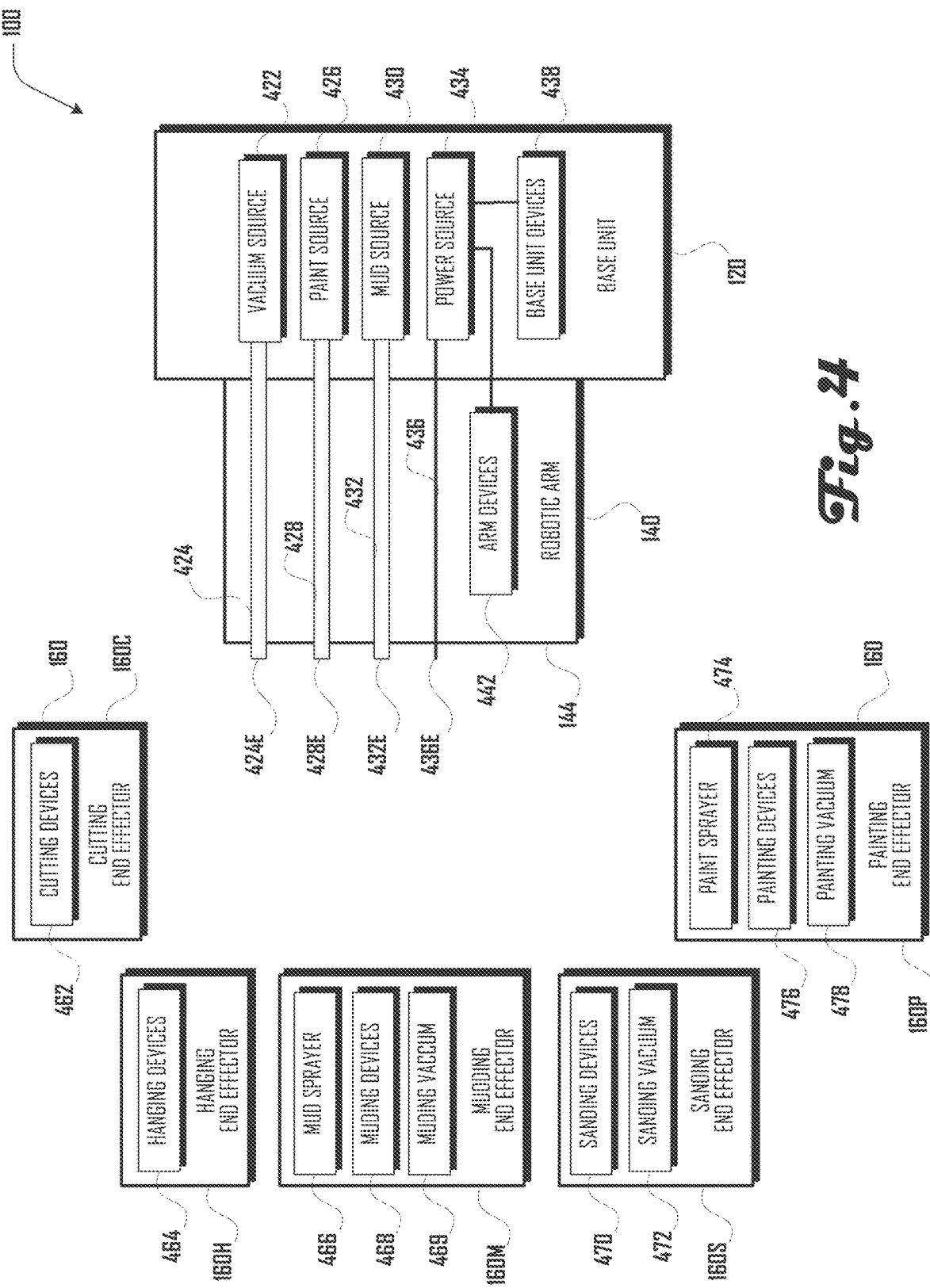
FIG. 4 is an exemplary block diagram illustrating systems of an automated drywalling system in accordance with one embodiment, including a plurality of end effectors configured to couple to an end of a robotic arm.

Turning to FIG. 4, an exemplary block diagram illustrating systems of an automated drywalling system 100 that includes a base unit 120 coupled to a robotic arm 140 and including a plurality of end effectors 160 configured to couple to the distal end 144 of the robotic arm 140. In this example, the end effectors 160 include a cutting end effector 160C, a hanging end effector 160H, a mudding end effector 160M, a sanding end effector 160S and a painting end effector 160P.

As shown in FIG. 4, the base unit 120 can comprise a vacuum source 422, a paint source 426, a mud source 430, a power source 432, and one or more base unit devices 438. In various embodiments, one or more of the vacuum source 422, paint source 426, mud source 430, and power source 432 can couple with a hub 130 (FIGS. 1 and 2) and provide resources to an end effector 160 coupled at the distal end 144 of the robotic arm 140 and/or to the robotic arm 140. For example, the vacuum source 422 can be coupled with a vacuum tube 424 that extends via the robotic arm 140 to an end 424E, which can couple with an end effector 160 as discussed herein. The paint source 426 can be coupled with a paint tube 432 that extends via the robotic arm 140 to an end 432E, which can couple with an end effector 160 as discussed herein. The mud source 430 can be coupled with a mud tube 432 that extends via the robotic arm 140 to an end 432E, which can couple with an end effector 160 as discussed herein.

The power source 434 can be coupled with a power line 436 that extends via the robotic arm 140 to an end 436E, which can couple with an end effector 160 as discussed herein. Additionally, the power source 434 can provide power to arm devices 442 of the robotic arm 140 (e.g., sensors 346 and movement system 348) and to base unit devices 438 of the base unit 120 (e.g., control system 322, vision system 324, sensors 326 and movement system 328). In various embodiments, the power source can comprise one or more batteries and/or can be configured to plug into wall receptacles at a work site. For example, a power cord can be coupled to the power source 438, which allow the drywalling system 100 to be powered by local power at a worksite via a wall receptacle, generator, external batteries, or the like. However, in some embodiments, the automated drywalling system 100 can be completely self-powered and can be configured to operate without external power sources at a worksite. In further embodiments, the robotic arm 140 and/or end effectors 160 can comprise a separate power source that can be separate from the power source 438 of the base unit.

In various embodiments, the automated drywalling system 100 can be configured to perform a plurality of tasks related to installing and finishing drywall in construction. In such embodiments, it can be desirable to have a base unit 120 and robotic arm 140 that can couple with and operate a plurality of different end effectors 160 to perform one or more tasks or portions of tasks related to drywalling. For example, the cutting end effector 160C, hanging end effector 160H, mudding end effector 160M, sanding end effector 160S and painting end effector 160P can be selectively coupled with the robotic arm 140 at the distal end 144 to perform respective tasks or portions of tasks related to drywalling.

For example, the cutting end effector 160C can be coupled at the distal end 144 of the robotic arm 140 and coupled with the power line 436 to power cutting devices 462 of the cutting end effector 160C. The cutting end effector 160C can be controlled by the automated drywalling system 100 to cut drywall or perform other cutting operations. In some examples, the cutting end effector 160C can comprise a cutting vacuum that is coupled to vacuum source 422 via the vacuum line 424 to ingest debris generated by cutting done by the cutting end effector 160C.

The hanging end effector 160H can alternatively be coupled at the distal end 144 of the robotic arm 140 and coupled with the power line 436 to power hanging devices 464 of the hanging end effector 160H. The hanging end effector 160H can be controlled by the automated drywalling system 100 to hang drywall, assist with drywall hanging, or the like.

The mudding end effector 160M can alternatively be coupled at the distal end 144 of the robotic arm 140 and coupled with the power line 436 to power mudding devices 466 and/or mudding applicators 468 of the mudding end effector 160M. The mudding end effector 160M can be controlled by the automated drywalling system 100 to perform "mudding" or "mud work" associated with drywalling, including application of joint compound (also known as "mud") to joints between pieces of hung drywall, and the like. Joint compound as discussed herein can encompass pre-mixed, topping, taping, multi-use, all-purpose, and setting type compounds. Additionally, the mudding end effector can also be configured to apply joint tape, or the like. Additionally, the mudding end effector 160M can comprise a mudding vacuum 469 that is coupled to vacuum source 422 via the vacuum line 424 to ingest excess joint compound or mud generated by the mudding end effector 160M.

The sanding end effector 160S can alternatively be coupled at the distal end 144 of the robotic arm 140 and coupled with the power line 436 to power sanding devices 464 of the sanding end effector 160S. The sanding end effector 160S can be controlled by the automated drywalling system 100 to sand mudded drywall, and the like. Additionally, the sanding end effector 160S can comprise a sanding vacuum 472 that is coupled to vacuum source 422 via the vacuum line 424 to ingest debris generated by sanding done by the sanding end effector 160S.

The painting end effector 160P can alternatively be coupled at the distal end 144 of the robotic arm 140 and coupled with the power line 436 to power a paint sprayer 474 and/or painting devices 476 of the painting end effector 160P. The painting end effector 160P can be controlled by the automated drywalling system 100 to paint drywall or other surfaces. Additionally, the painting end effector 160P can comprise a painting vacuum 472 that is coupled to vacuum source 422 via the vacuum line 424 to ingest excess paint spray generated by painting done by the painting end effector 160P.

Although the example automated drywalling system 100 of FIG. 4 is illustrated having five modular end effectors 160, other embodiments can include any suitable plurality of modular end effectors 160, with such end effectors 160 having any suitable configuration, and being for any suitable task or purpose. In further examples, the automated drywalling system 100 can comprise a single end effector 160, which can be permanently or removably coupled to the robotic arm 140. Additionally, in some examples a given end effector 160 can be configured to perform a plurality of tasks. For example, in one embodiment, an end effector 160 can be configured for mud work, sanding and painting. Accordingly, the example of FIG. 4 should not be construed to be limiting on the wide variety of other embodiments that are within the scope and spirit of the present disclosure.

Figure 5:
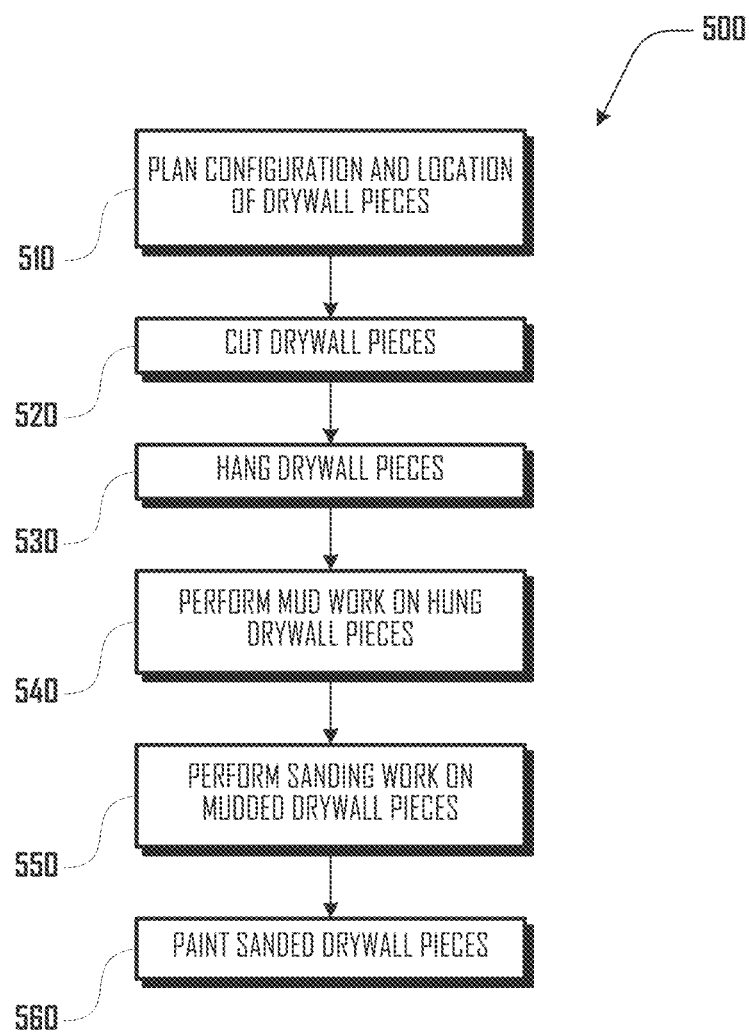
FIG. 5 illustrates a block diagram of method of installing drywall in accordance with one embodiment.

Turning to FIG. 5, a method 500 of drywalling is illustrated, which can be performed in whole or in part by an automated drywalling system 100 as discussed herein. The example method 500 or portions thereof can be performed automatically by the automated drywalling system 100 with or without user interaction.

The method 500 begins at 510, where a configuration and location of drywall pieces is planned. For example, in some embodiments, the automated drywalling system 100 can be configured for automated scanning and mapping of a worksite (e.g., framing elements of a house or building) and automated planning of the shapes and sizes of drywall to be disposed at the worksite to generate walls, ceilings, and the like. Such scanning and mapping can include use of vision systems 324, 364 (FIG. 3) and the like. Planning of shapes and sizes of drywall can be based at least in part on the scanning and mapping and can be performed by a computing device 100 of the automated drywalling system 100 or other suitable device which can be proximate or remote from the automated drywalling system 100. In some embodiments, such planning can be based at least in part on building plans or maps that were not generated by the automated drywalling system 100.

The method 500 continues to 520, where drywall pieces are cut. Such cutting can be based at least in part on the scanning, mapping and planning discussed above. Additionally, such cutting can be performed by the automated drywalling system 100 at a worksite (e.g., via a cutting end effector 160C) or can be performed by a system remote from the worksite and generated drywall pieces can be delivered to the worksite.

At 530, generated pieces of drywall can be hung at the worksite, including hanging on studs, beams, posts, wall plates, lintels, joists, and the like, to define walls, ceilings and the like. Screws, nails or other suitable fasteners can be used to hang the drywall pieces. In some embodiments, the automated drywalling system 100 can be configured to hang drywall pieces including positioning the drywall pieces and coupling the drywall pieces in a desired location. In some examples, the automated drywall system 100 can be configured to assist a user in hanging drywall, including holding the drywall and/or tools in place while the user fixes the drywall pieces in place. In various examples, a hanging end effector 160H can be used for such drywall hanging.

At 540, mud work can be performed on the pieces of hung drywall. For example, joint compound (known also as "mud") can be applied to seams or joints between adjacent pieces of drywall, over faces of the drywall, and/or can be applied over fasteners such as drywall screws or the like. In various examples, a mudding end effector 160M can be used to perform such mud work.

At 550, sanding can be performed on the mudded pieces of drywall. For example, where wet joint compound is applied to hung drywall pieces, the joint compound can be allowed to dry and can then be sanded by a sanding end effector 160S of an automated drywall system 100. In various examples, sanding can be performed to smooth out joint compound to generate a planar or otherwise consistent profile on the pieces of drywall in preparation for painting. At 560, the sanded drywall pieces can be painted. For example, in various examples, a painting end effector 160P of an automated drywalling system 100 can be used to paint the drywall pieces.

Although the method 500 of FIG. 5 relates to hanging and finishing drywall, it should be clear that other hanging and finishing methods can similarly be employed by the automated drywalling system 100, including methods related to hanging particle board, plywood, sheet rock, laminate, tile, wall boards, metal sheeting, lath and the like. Similarly the methods can be used with different coatings including plaster, polymer coatings, cement, stucco, organic coatings, and the like. Accordingly, the method 500 of FIG. 5 should not be construed to be limiting.

During mud work, automated drywalling system 100 can apply a layer or profile of compound that is greater than a thickness that is conventionally manually applied by human workers to allow for a sanding system (e.g., a sanding end effector 160S) to sand down the compound to a desired plane. For example, in some examples, manual joint compound application mud can be profiled to taper from high points. The automated drywalling system 100 can apply a thicker layer than normal enabling a sanding system to sand down high points to be level to the adjacent surfaces.

For example, FIGS. 6*a*, 6*b*, 6*c*, 6*d* and 6*e* illustrate one example of a mud application profile for a pair of drywall pieces 610A, 610B that form a seam 620, where joint compound 630 is applied over consecutive layers, which can include joint tape 640, to taper out the high points of joint compound 630 over a wider area. Sanding can then be used to smooth out the final profile. The high points of joint compound 630 can be caused by various features, including the seam 620, feature, raised stud, defect, or any combination of these. In some embodiments, such a mud application can be undesirable for automated application; however, in further embodiments, such a mud application profile can be employed by an automated system such as the automated drywalling system 100.

FIGS. 7*a* and 7*b* illustrate an example joint compound application process where the joint compound 630 is applied in a thick layer using a sprayer that generates a mud spray 700. Such an application process can be performed by the automated drywalling system 100 in various embodiments. The thickness of the joint compound 630 being applied to the pieces of drywall 610A, 610B defining the seam 620 can allow for a sanding system to be used to sand back high points of joint compound 630 to a level surface. The high points of joint compound 630 can be caused by the seam 620, feature, raised stud, defect, or any combination of these.

Figure 8A:
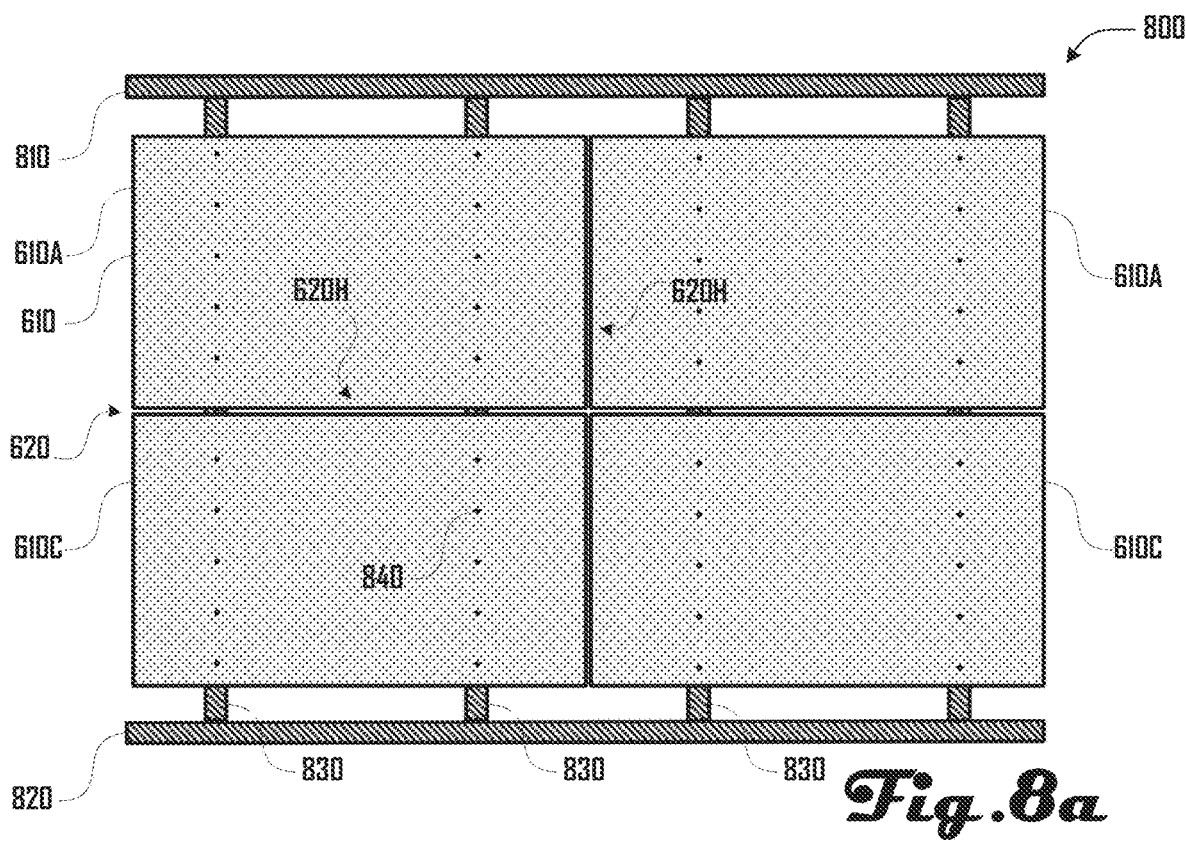
FIGS. 8a, 8b, 9a, 9b illustrate a series of steps in an example method of installing drywall to generate a wall assembly.
Figure 8B:
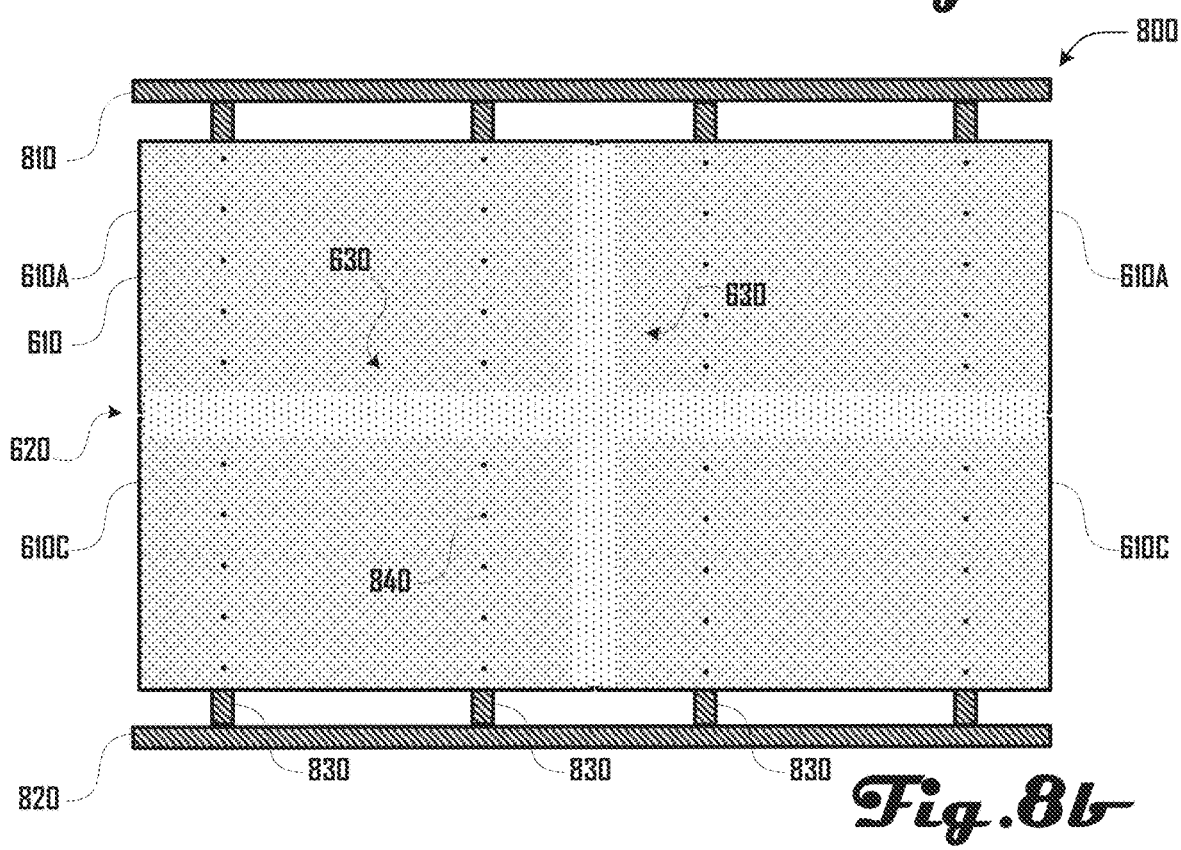
Figure 9A:
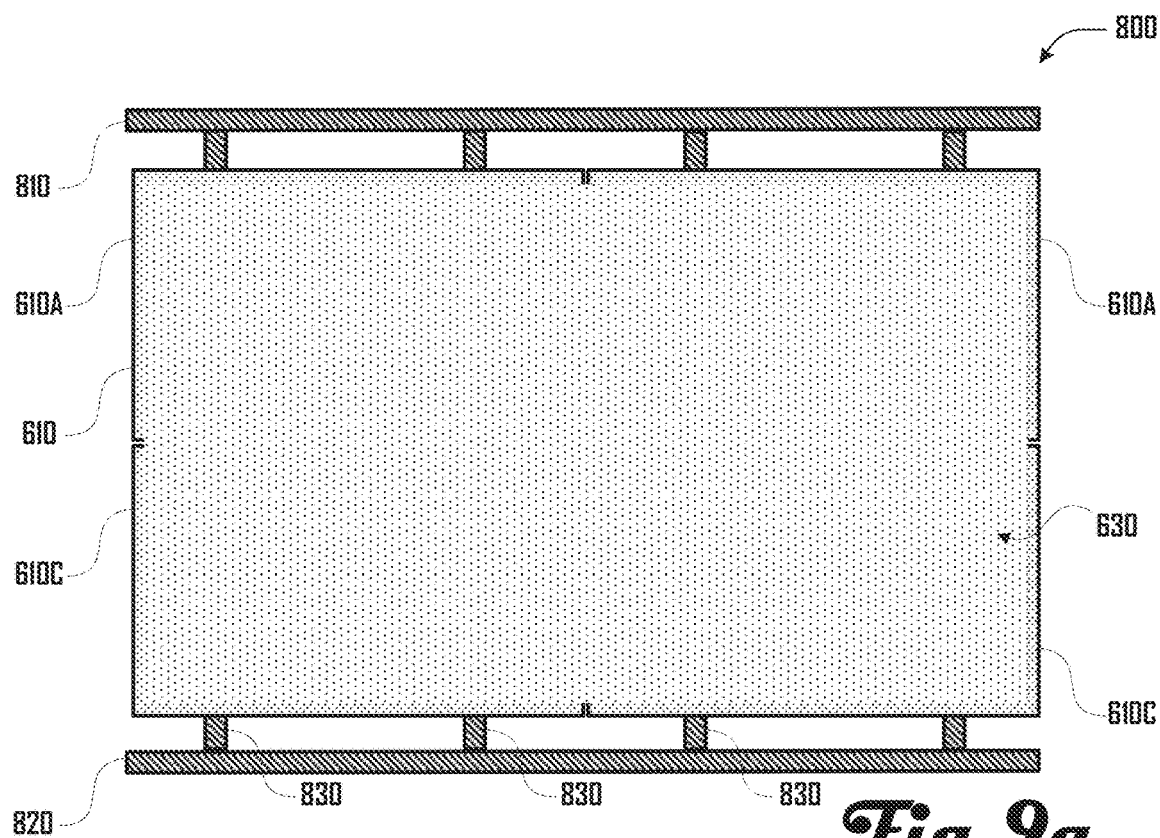
Figure 9B:
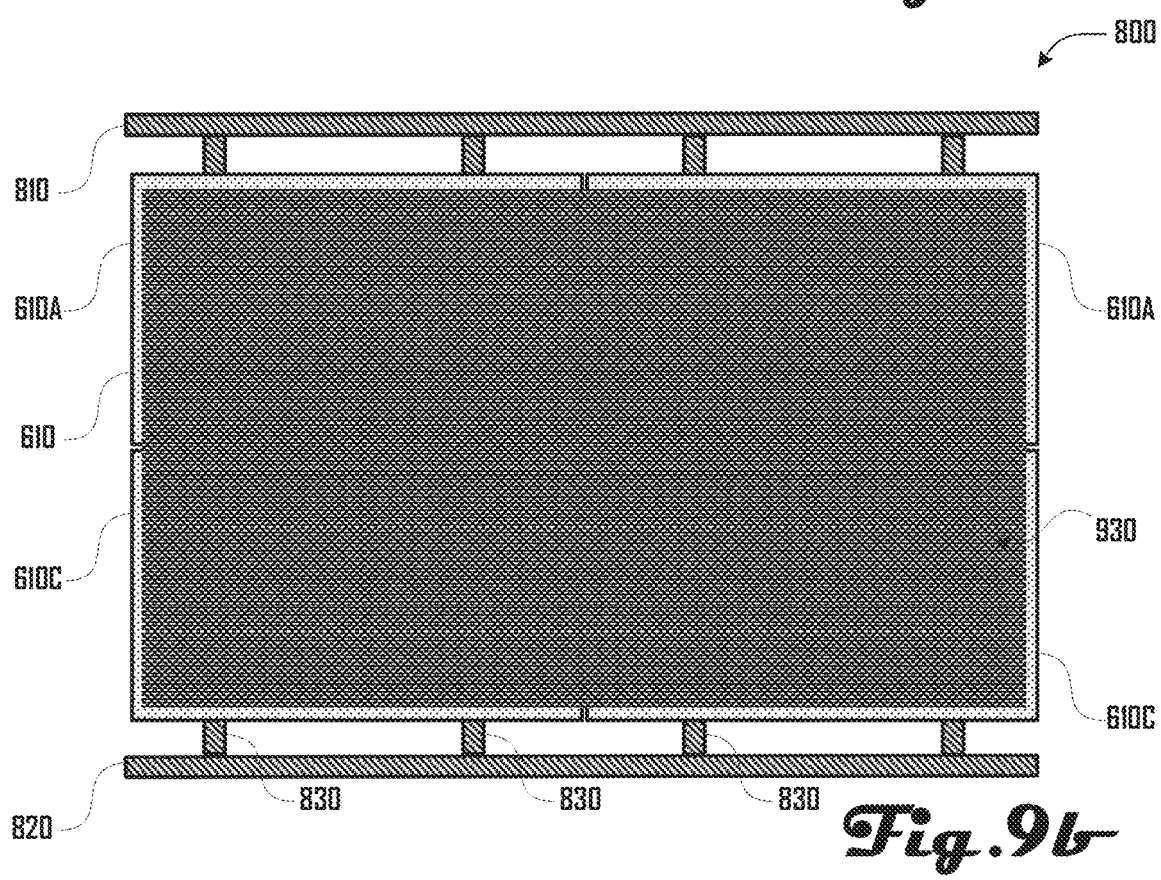

Turning to FIGS. 8*a*, 8*b*, 9*a* and 9*b*, examples of a wall assembly 800 including a plurality of drywall pieces 610A, 610B, 610C, 610D is illustrated. The wall assembly 800 can comprise a header 810 and footer 820, with a plurality of studs 830 extending therebetween. As shown in FIG. 8*a*, the drywall pieces 610 can be coupled to the studs 830 via a plurality of fasteners 840 (e.g., drywall screws) that extend though the drywall pieces 610 and into the studs 830. The drywall pieces 610 can define one or more seams 620, including in the example of FIG. 8*a* a vertical seam 620V and a horizontal seam 630H. In some embodiments, mud work can be performed on the seams 620 as shown in FIG. 8*b* and leaving portions of the drywall pieces 610 without joint compound 630. Additionally or alternatively, joint compound can be applied to portions of the drywall pieces 610 in addition to about the seams 620 as shown in FIG. 9. The wall assembly 800 of FIG. 8*b* or 9*a* can then be sanded to generate a smooth profile or other profile as desired and the sanded wall assembly can be coated with paint 930 as shown in FIG. 9*b*.

Figure 10:
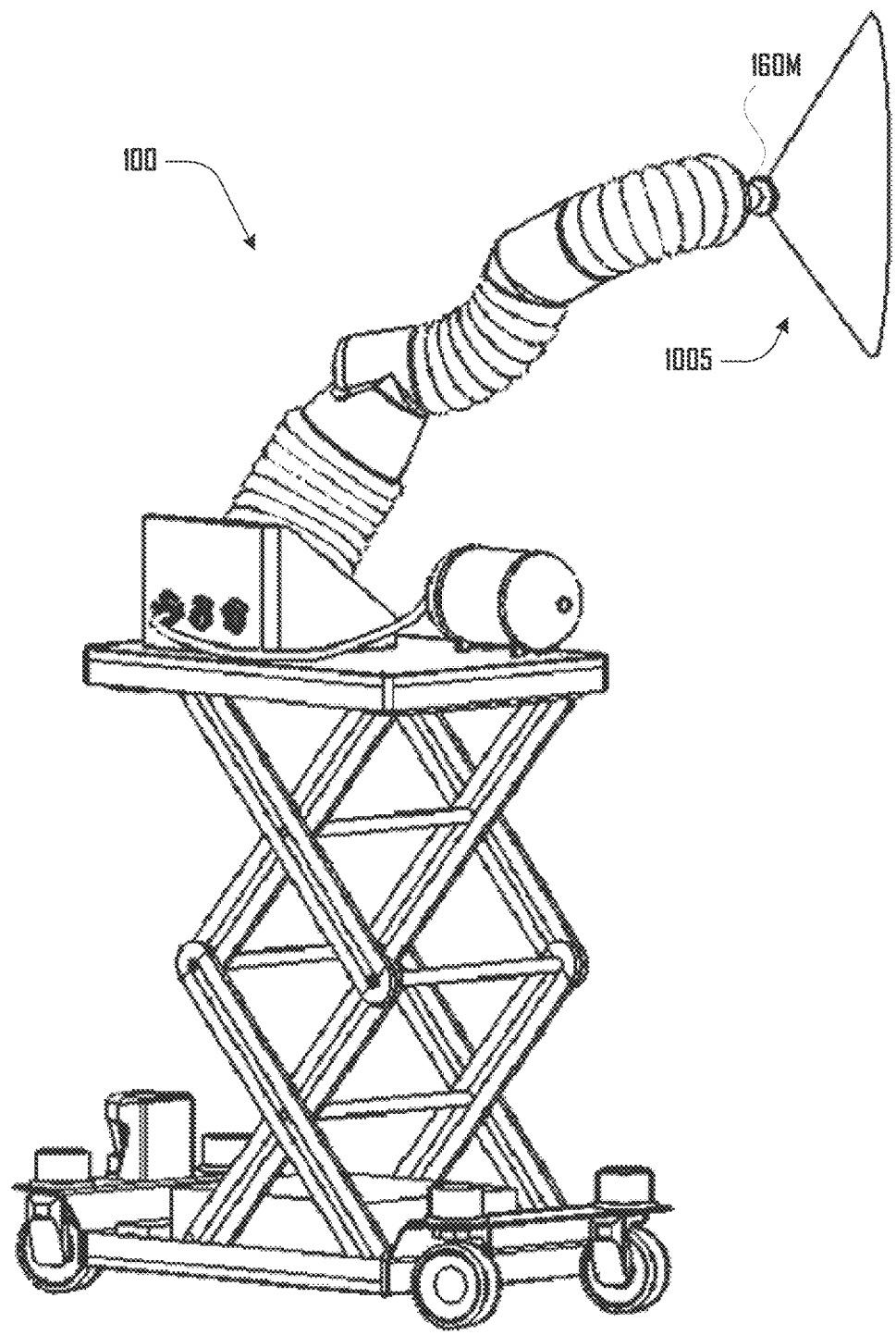
FIG. 10 illustrates an embodiment of a drywalling system sanding a wall assembly in accordance with one embodiment.

FIG. 10 illustrates one example embodiment of the automated drywall system 100, having a painting end effector 160P that is configured to generate a paint spray. In this example embodiment, the system 100 is shown comprising a robotic arm 140 with a painting end effector 160 with integrated overspray or fume collection 1005. The robotic arm 140 and end effector 160 are shown mounted on a mobile base 120 with a vertical lift 126. The base unit 120 can carry supporting systems for the automated drywall system 100 as discussed herein.

In one aspect, the present disclosure pertains to automatic systems and methods for painting and applying protective coatings onto a substrate. For example, in one embodiment the system 100 can be used to mix, deliver, apply, and/or dry paint on drywall boards 610. In another embodiment the system 100 can be used to apply wallpaper on drywall boards. Although examples herein may discuss paint, the system 100 can also be used with any other suitable coatings including varnishes, films, polymer coatings, and the like, which can be applied onto any suitable substrate including drywall, wood, metal, polymers, or the like. The system 100 can be configured for handling how such a coating is prepared, how it is delivered onto the substrate and how it is set, cured or dried.

The system 100 can include one or more vision systems 324, 364 and/or sensors 326, 346, 366 (e.g., humidity, temperature, air flow sensors, or the like) to establish environmental conditions for a painting. The automated drywalling system 100 can utilize data from such environmental sensors to determine a desired paint composition, set path parameters such as feed speed, thickness of coating applied, roller pressures, paint sprayer settings, and the like. Environmental information in conjunction with paint parameters can be used to determine or estimate drying times for the paint allowing the system 100 to plan when a next step should begin. The system 100 can also determine when applied paint has set and dried with one or more of the vision systems 324, 364 and/or sensors 326, 346, 366. For example, in some embodiments, the system 100 can make such a determination by identifying the moisture content of target surfaces by measuring thermal conductivity of the target surfaces; using a thermal imaging camera or thermometer (contact or non-contact); by detecting differences in colors using a camera, or any combination of these. Thermal measurements can be used to infer the moisture content of applied paint and/or a substrate on which the paint has been applied by comparing the temperature of the paint to the surrounding materials. For example, as water or other solvent evaporates from an applied paint mixture, the temperature of the paint can be lower than that of the surrounding materials. Models of a paint drying process can also be used to estimate the time to dry or cure given a set of starting conditions and information about the environment. Similarly, paint models in combination with environmental and substrate information can be used to estimate the finish quality of the material. One or more of the vision systems 324, 364 and/or sensors 326, 346, 366 can be used in conjunction with an HVAC system or heater, air conditioner, fans, or the like to control the room conditions. For example, sensor readings can trigger any such environment systems or a combination thereof to maintain the room at the desired conditions for quality, reduced drying or setting time, or comfort of the operator. In other words, in some embodiments, the system 100 can communicate with and control various environmental conditioning systems to modify the environmental conditions to be more conducive to desired painting conditions related to preparation, application, drying and/or curing of paint.

The automated drywalling system 100 can comprise a variety of tools that enable the system 100 to mix paint, deliver paint, apply paint, smooth paint, dry paint, cure paint, or the like. Such tools can be positioned and controlled using the base unit 120, robotic arm 140, end effector 160, positioning stage, gantry or the like. In some embodiments, a single robotic arm 140 or any suitable plurality of robotic arms 140 can be used to complete a painting task through coordinated or individual paths. The one or more robotic arms 140, and/or end effectors 160 can be moved around the room using the mobile base 120 that can be powered or moved manually by an operator.

The base unit 120, robotic arm 140, and/or end effector 160 can include one or more vision systems 324, 364 and/or sensors 326, 346, 366 to provide for safe operation next to users. Such one or more vision systems 324, 364 and/or sensors 326, 346, 366 can include, but are not limited to, laser curtains, proximity sensors, force and torque sensors, pressure sensors, limit switches, a system to track location of the user relative to the robot or mobile base, speed limiters, vision systems, LIDAR, radar, sonar, or any combination of these. The mobile base 120 can include a vertical lift 126 component that can be powered or unpowered. The vertical lift 126 can be used to lift or lower the platform 122, robotic arm 140, end effector 160, positioning stage, gantry or painting tools. The lift 126 can be instrumented with a position sensor that can be used to capture and control the height of the lift 126.

The automated drywalling system 100 can be controlled using a planning system (e.g., a planning program executed by the control system 322 or other suitable device) that takes a variety of inputs (e.g., from vision systems 324, 364 and/or sensors 326, 346, 366) to determine tool paths and/or tool parameters for the base unit 120, robotic arm 140, and/or end effector 160 to achieve desired coating characteristics and to perform various painting tasks. In some examples, a step in a method for automated painting includes creating a map of the target surfaces at a worksite (e.g., of wall assemblies 800 as shown in FIGS. 8*a*, 8*b*, 9*a*, 9*b* or the like). Such a map or model can be created by importing building information modeling (BIM) and/or 2D, 3D plans into the planner system. A map can also be created directly by the system 100 by utilizing one or more of vision systems 324, 364 and/or sensors 326, 346, 366 to scan the room. In some embodiments, one or more of the vision systems 324, 364 can include stereo cameras, structured light, cameras, LIDAR, radar, sonar, laser scanners, thermal imaging, or the like. Uploaded 3D or 2D plans can be combined with field data to create a more accurate map of a room or worksite. Data from different sources can be combined using key features and user input. A map can include the location of the framing studs, drywall joints, openings, protrusions, as well as pipes, electrical conduit, ventilation ducts, and any other components installed on the walls or ceilings. These locations can be derived from uploaded plans, a room scan and/or user inputs. To facilitate the creation of a map, a user can help identify features through analysis of images, and/or tagging of the features physically or digitally. The user can physically tag components using a laser, tags, markers or a combination of these. One or more of the vision systems 324, 364 and/or sensors 326, 346, 366 can sense or identify these tags or track them as the user moves around the room and locates the features. A mapping system or planner system of an automated drywalling system 100 can also take as an input a layout of how the drywall boards 610 were hung in the room to locate seams 620. This layout can be an input from the automated drywalling system 100 generated at other stages of a drywalling project performed by the automated drywalling system 100, including drywall planning, drywall cutting, drywall hanging, drywall mudding, drywall sanding, and the like. The location of the framing, type of anchors used and layout of the drywall 610 can provide information on the planarity, flatness of the wall, and location of high or low points.

The automated drywalling system 100 can include a computational planner (e.g., a program executed by the control system 322 or other suitable device), which can utilize a map uploaded to the system 100 and/or a map created by the mapping system to determine tool paths and/or tool parameters required to achieve a desired paint coating application. The planner can create toolpaths off a global map of the room and then update these paths given updated local measurements once the base unit 120, robotic arm 140, and/or end effector 160 are in place. The planner can be informed by data from one or more of the vision systems 324, 364 and/or sensors 326, 346, 366 on the flatness of the wall, user inputs, location of seams 620 as specified by a layout planner or a scan of the room after the substrate was applied, or the like. The planner can produce toolpaths and/or tool parameters, which can enable the system 100 to apply paint, wall paper or other coatings to surfaces. The tool parameters and/or tool paths can also be determined by a desired or defined finish of the coating. For example, areas that are exposed to changing, harsh, or bright lights can receive a higher quality finish with tighter controls on paint thickness, overlaps, textures, wall paper seam location, and the like.

2D or 3D maps created by the system 100 can be registered to the physical environment utilizing recognizable features such as doors, windows, outlets, corners, or the like. The registration can also be done using markers, tags, laser outlines, or the like that are placed in the room or worksite. A projection or visualization system can find such features or markers and can locate the maps created using these. The system 100 can utilize a user interface to enable a user to help locate the map or projection relative to the environment and resolve any issues or discrepancies. The user can utilize a physical marker to signify key features for the system 100 allowing it to locate the plan relative to the environment. The system 100 can also use the base unit 120, robotic arm 140, and/or end effector 160 to find target features, markers or surfaces and locate them relative to its own base which can be located using one or more vision systems 324, 364 and/or sensors 326, 346, 366, which in some examples can include laser range finders, computer vision, LIDAR, radar, sonar, stereo vision, odometry, IMUs, or the like.

The robotic arm 140 can utilize a compliant or force limiting end effector 160 to enable safe contact with the environment allowing the system 100 to accurately locate target surfaces, features or components, accommodate errors in positioning without damaging the substrate or the robotic arm 140 or end effector 160. By utilizing the robotic arm 140 and compliant end effector 160 to locate a physical component, the system 100 can establish a point, line, or plane and therefore locate the virtual plan on the environment. Toolpaths can then be updated from the virtual plane to the physical plane. Refitting of the paths onto the contacted surfaces enables the system 100 to deal with errors and discrepancies between the modeled and physical environment. These tools enable quick on-site calibration using global room-wide maps and local measurements. Refitting the tool paths can allow for correction of errors in positioning of the base unit 120, robotic arm 140, and/or end effector 160. The base unit 120, robotic arm 140, and/or end effector 160 can also utilize one or more vision systems 324, 364 (e.g., radar, sonar, thermal imaging, or the like) to establish what is behind the substrate, and this information can be used to update a virtual map and ensure that no damage is done to any electrical, plumbing or ventilation.

The planner of the system 100 can output tool poses or tool paths for the base unit 120, robotic arm 140, and/or end effector 160, including joint commands, target poses and end effector positions, or the like. The system 100 can also output paths for a gantry system or positioning stage which can be used in conjunction with the robotic arm 140, or without a robot, to move and position coating tools of an end effector 160. The planner can also output paths for the mobile base 120 to position a gantry, positioning stage, or robotic manipulator 140, to move a tool to assist the user in the finishing process, or position visualization and/or lighting equipment. The mobile base 140 including the vertical lift 126 can work in coordination with the user, robotic manipulator 140, end effector 160, gantry or a combination of these to execute a painting or coating task. The planner system can control the different components of the platform such as the base unit 120, robotic arm 140, and/or end effector 160, which can allow for coordinated movements and forces with the target goal of moving the end effector 160 to a desired position under the prescribed forces and moments. The position of the mobile base 120 can be used as a rough positioning stage, with the vertical lift 126 setting a height of the robotic manipulator 140 which can act as a fine positioning stage.

Figure 11:
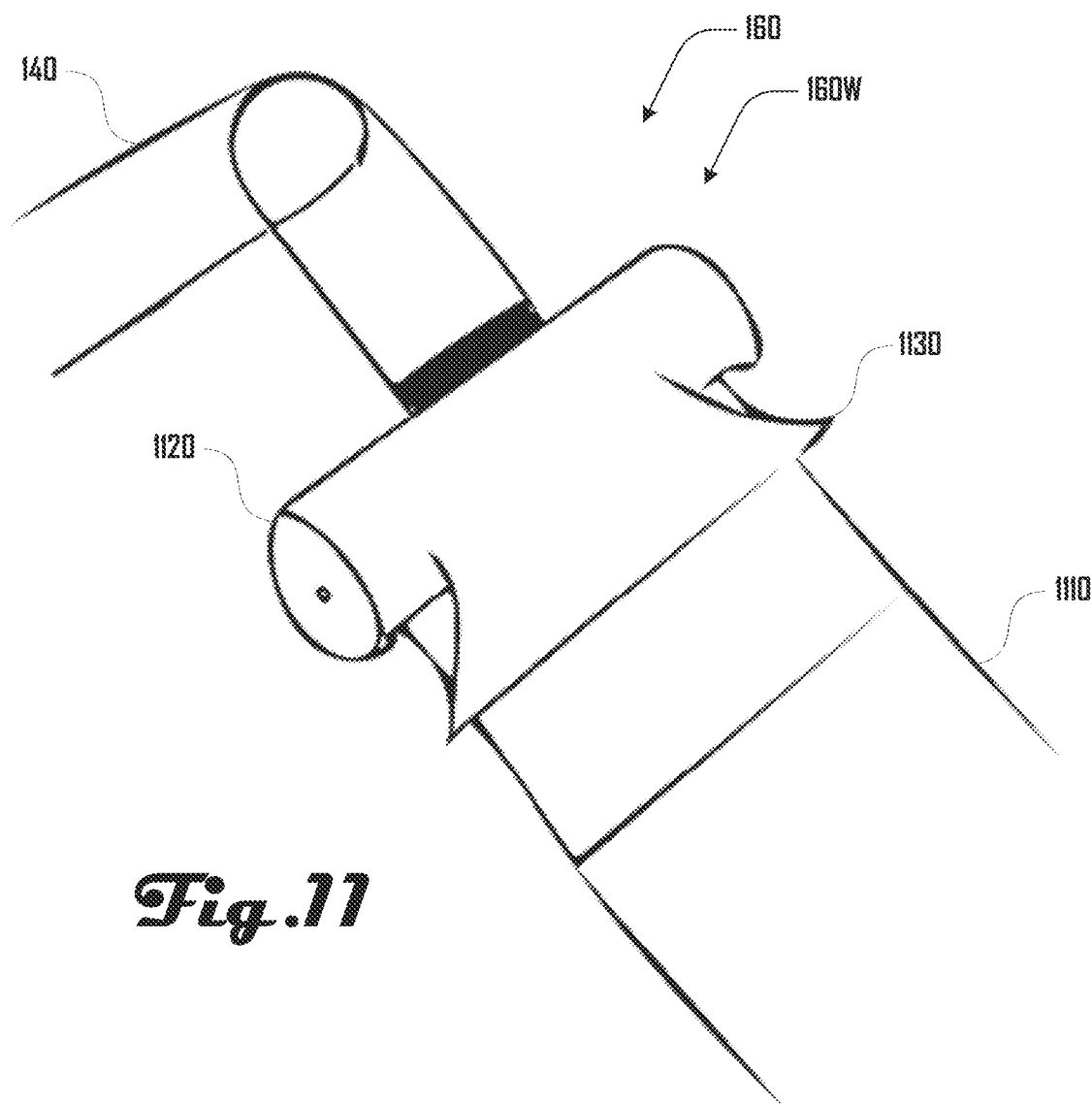
FIG. 11 illustrates an embodiment of a painting end effector configured to automatically dispense and apply wallpaper on drywall boards.

Although various embodiments discussed herein relate to painting, some embodiments can relate to applying wallpaper or other planar material to a substrate. For example, FIG. 11 illustrates an example embodiment of a wallpaper applicator end effector 160W, wherein a roll of wallpaper 1110 is mounted within a roll body 1120 of the end effector 1130 and fed through a blade 1130. The wallpaper end effector 160W can be moved over a target surface and the blade 1130 can press down the wallpaper onto the surface. In some examples, adhesive can be present of the rolled wallpaper 1100 applied to the wall, or the wallpaper 1110 can be without an adhesive and the wallpaper 1110 can be applied over an adhesive that has been applied to the target surface. In some examples, an adhesive can be applied with an end effector 160 by spraying. Some examples can include a separate end effector 160 having an adhesive spray gun, or an adhesive spray gun can be part of a wallpaper end effector 160W, that is configured to apply adhesive in front of the wallpaper 1110 onto a surface that the wallpaper 1110 is being applied to and/or by applying the adhesive onto the wallpaper 1110 before the blade 1130. The wallpaper 1110 can come pre-impregnated with adhesive in some examples.

In various embodiments, the system 100 can utilize various suitable end effectors 160 to automatically dispense and apply wallpaper 1110 on drywall boards 610 or other suitable substrate. In one embodiment, the wallpaper 1110 can be fed off a roll onto a wall after being covered with adhesive. In another embodiment, the adhesive is delivered ahead of the wallpaper 1110 through a roller, sprayer, brush, or the like and the wallpaper 1110 is applied onto the surface using a blade, trowel, roller, or the like. Tracking the position of a wallpaper end effector 160W with one or more of the vision systems 324, 364 and/or sensors 326, 346, 366 can enable the planner system to create an updated map of the room with the location of the wallpaper 1110 and the conditions under which the wallpaper was applied. The one or more of the vision systems 324, 364 and/or sensors 326, 346, 366 can use tags or markers to track as a user manually applies the wallpaper 1110 on the surfaces and that information can be fed into the planner. The base unit 120, robotic arm 140, and/or end effector 160 can be used to control the orientation of wallpapering tools of the end effector 160 and the force applied on the target surface as the wallpaper 1110 is applied, which can ensure the wallpaper 1110 is applied with the required pressure for adhesion.

Figure 12:
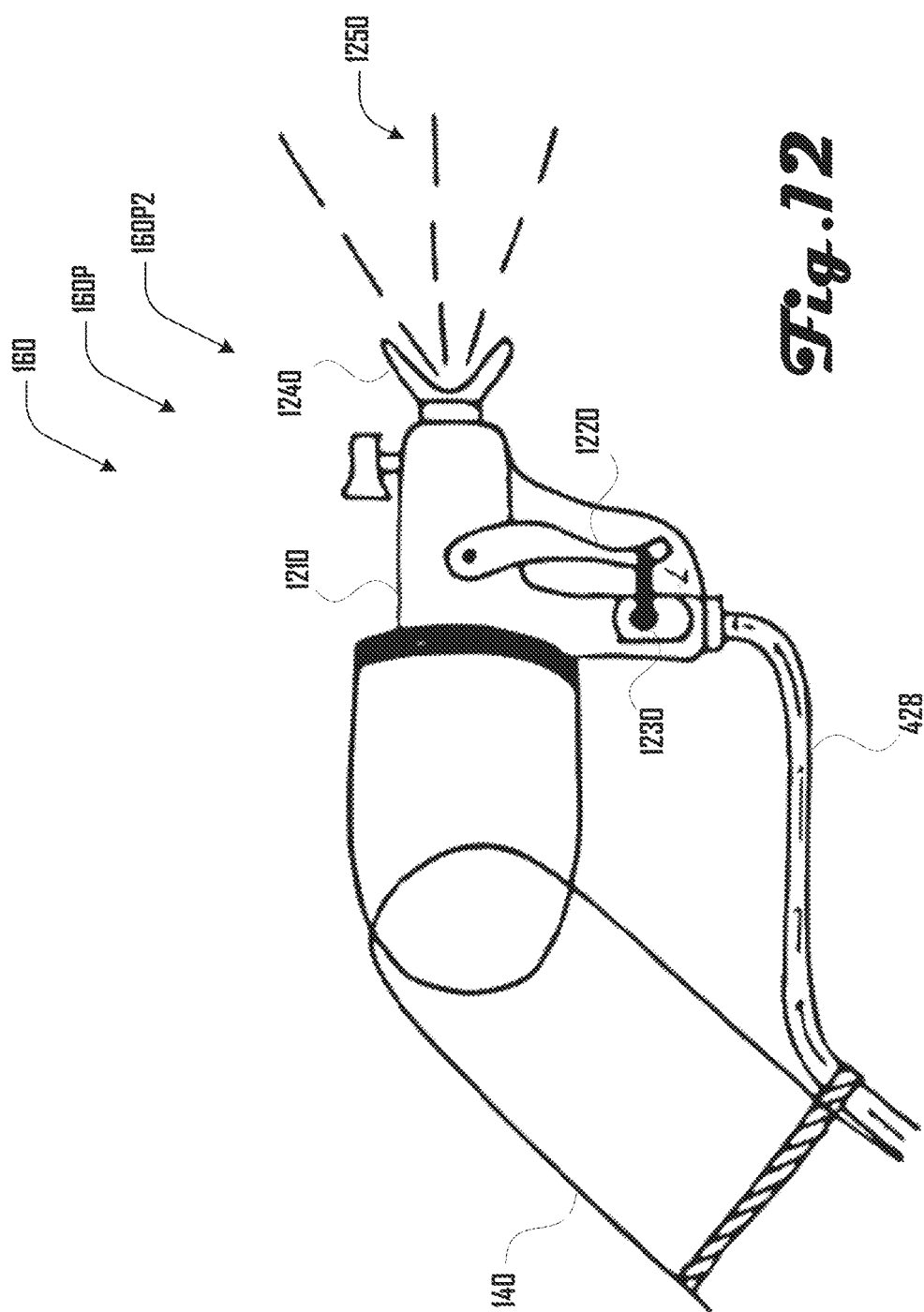
FIG. 12 illustrates one embodiment of a painting end effector that includes a spray gun that is coupled onto the robotic arm.

FIG. 12 illustrates one embodiment 160P2 of a painting end effector 160P that includes a spray gun 1210 that is coupled onto the robotic arm 140. A trigger 1220 can be actuated with an actuator 1230 (e.g., a servo, solenoid, pneumatic cylinder, or the like) which can pull on the trigger 1220 to open the nozzle 1240 to generate a paint spray 1250.

Figure 13:
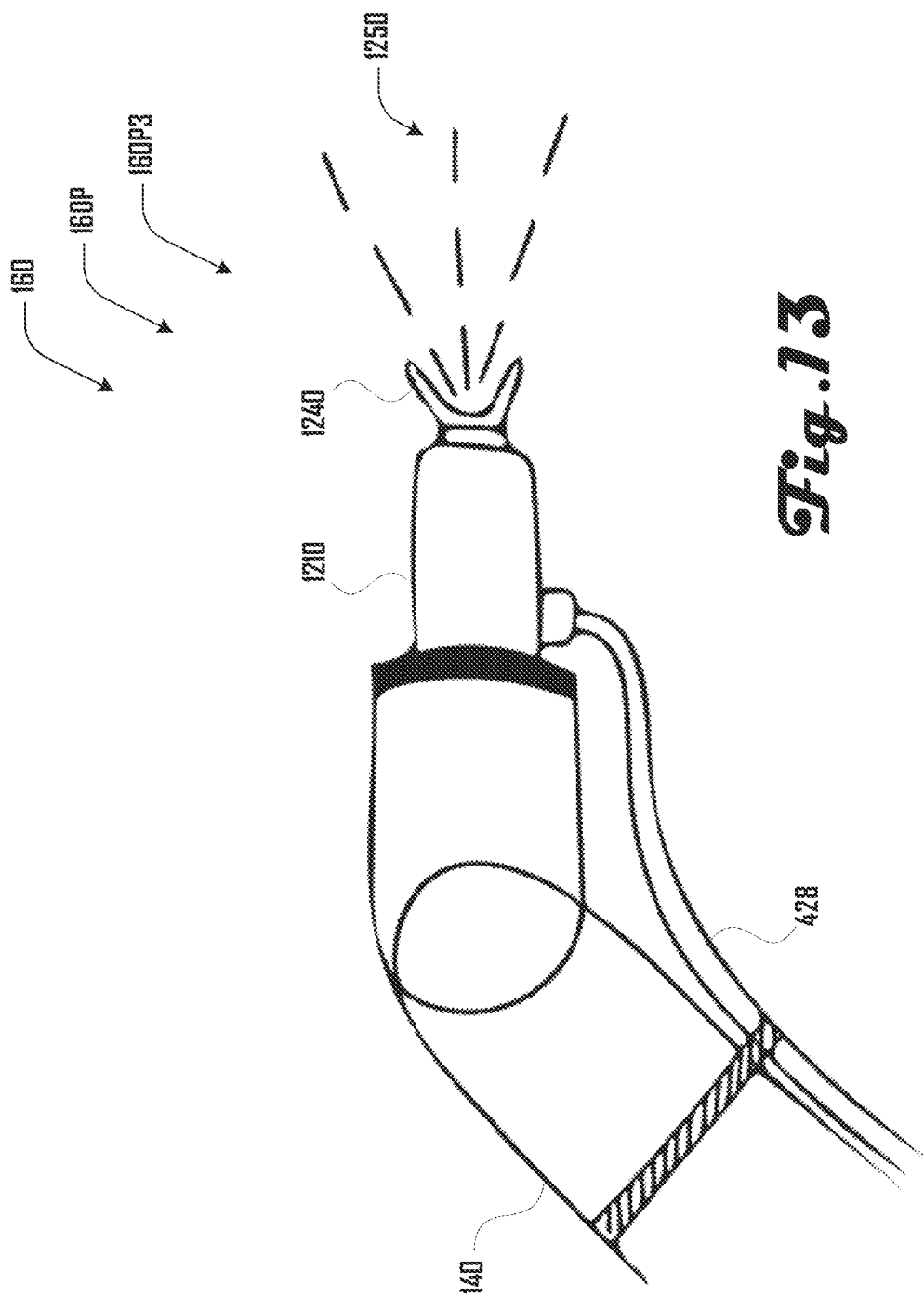
FIG. 13 illustrates another embodiment of a painting end effector that includes a spray gun that is coupled onto the robotic arm.

In another example, FIG. 13 illustrates another embodiment 160P3 of a painting end effector 160P that includes a spray gun 1210 that is coupled onto the robotic arm 140. An internal trigger (not shown) can be actuated with an actuator (e.g., a servo, solenoid, pneumatic cylinder, or the like) which can open the nozzle 1240 to generate a paint spray 1250. In the examples of FIGS. 12 and 13, paint can be fed to the spray gun 1240 and nozzle 1240 via a paint tube 428, which can feed paint (or other suitable coatings in further embodiments) from a paint source 426 disposed at the base unit 120 (See FIG. 4).

In various embodiments, a painting end effector 160P is used to deliver paint or other suitable coating to a target surface. In some examples a spray gun 1210 can comprise an airless spray system or air assisted spray system. A pump can be used to move the paint 930 from the paint source 426 to the spray gun 1210. The paint 930 can be pumped at high pressures, in some examples, to enable the paint 930 to be sprayed or aerosolized. In some examples, high paint particle speeds can produce a smoother finish, which can be desirable in some examples.

The pressure, flow rate, piping system resistance and the like, can be tuned or controlled by the automated drywalling system 100 to change the speed and amount of paint 930 being delivered to the spray gun 1210 and ejected from the nozzle 1240 as a spray 1250. The automated drywalling system 100 can use any suitable actuator (e.g., a servo, solenoid, air cylinder, linear actuator, or any combination of these) to open and close the nozzle 1240 of the spray gun 1210. As shown in the example of FIG. 12, a manual spray gun 1210 can be instrumented to use an electromechanical system 1230 to pull the trigger 1220 allowing the system 100 to control the timing of the joint compound delivery as well as the opening and closing of the nozzle 1240.

As shown in the example of FIG. 13, an automatic spray gun 1210 can also be used and controlled by the system 100 directly. The robotic arm 140 and end effector 160 and/or base unit 120 can thereby be used to spray paint 930 as a spray 1250 onto surfaces of drywall pieces 610 and/or seams 620 defined by one or more drywall pieces 610, which can be covered by joint compound 630 and/or joint tape 640. The painting end effector 160P can also be used to apply adhesive onto the surface for wallpaper application.

The spray gun 1210 can use a variety of suitable nozzles 1240 including fan shape, bell shape, or the like. The system 100 can also use a tunable spray gun 1210 that can control the shape of the nozzle 1210. The shape of the paint spray 1250 can be controlled in some examples by physically changing the shape of the nozzle 1210. The shape of the paint spray 1250 can also be controlled using air streams or the like which can act on the paint spray 1250.

In some embodiments, a cassette with different nozzles 1240 can be installed on the spray gun 1210 allowing the automated drywalling system 100 to select a desired nozzle 1240 to control the shape of the spray 1250. A fan shape can also be tuned by using a set of sliding mechanisms to set the fan width and opening of the nozzle 1240. The diameter of a bell may also be tuned by a sliding cone with expanding orifice size. The robotic arm 140 and/or base unit 120 can also be used to move the nozzle 1240 closer or farther away from a target surface resulting in a narrower or wider fan or bell spray pattern respectively. The system 100 can utilize an array or series of nozzles 1240 to spray the paint 930 over a larger surface. The nozzles 1240 can be individually controlled and tuned or such nozzles 1240 can be controlled as a unit.

A series of tests can be performed to establish the characteristics of a pattern of paint spray 1250 delivered by a nozzle 1240. In one embodiment, one or more vision system 324, 364 can be used to characterize a pattern of paint spray 1250 and provide feedback for tuning parameters including tool parameters related to a nozzle 1240, spray gun 1210, paint source 426, or the like, as discussed herein. Another embodiment can utilize an array of sensors (e.g., piezo sensors or other force sensors) on a test board which can be used to measure the force applied by the pattern of paint spray 1250 as it hits the sensors. The force pattern can be used to estimate a profile of the pattern of paint spray 1250 as it is hitting the surface. The feedback from these sensors may be used to tune the profile of one or more spray nozzles 1240, spray gun 1210, paint source 426, or the like.

The automated drywalling system 100 can include a mixer, pump and the like that can deliver mixed paint 930 to the various tools including a spray gun 1210. Such a mixer, pump and the like can be part of a paint source 426 disposed at the base unit 120 or disposed external to the system 100. In embodiments, where paint or other suitable coatings are used, a mixer can utilize sensors to control a mixing ratio of water, slurry, pigments, or dry coating material, and any additives that enhance structure of the coating material, color the coating material, decrease setting or drying time, or the like. The mixer can control the mix ratio by measuring the mass, volume, density, or viscosity of the components or the mixture that defines the paint 930 or other coating material. The mixing system can utilize pre-mixed paint 930 or can add water and/or additives as desired to a mixture.

Figure 14:
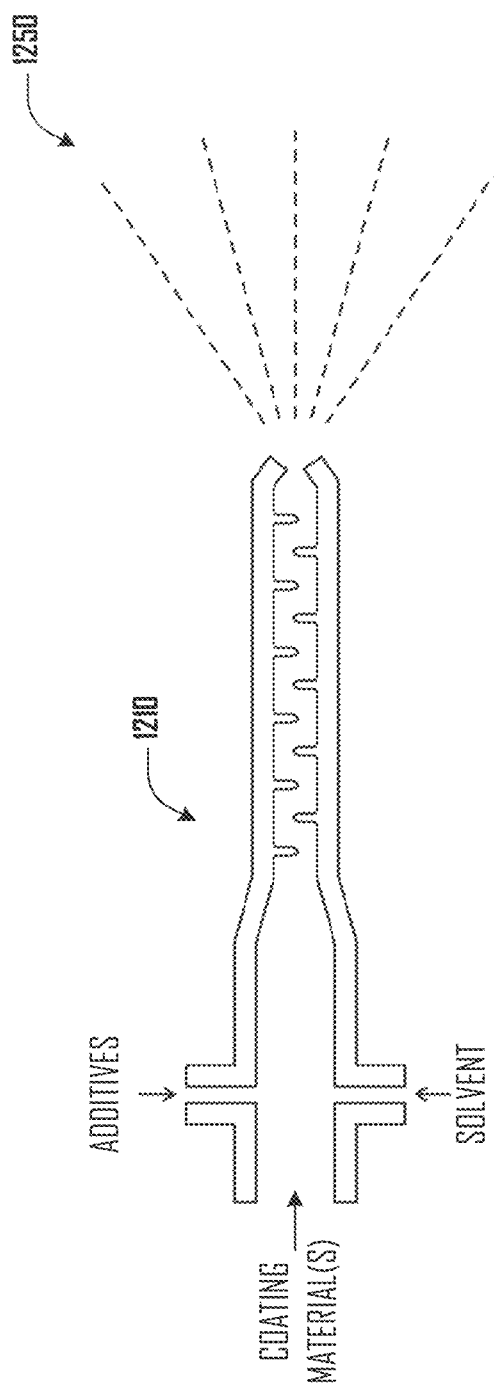
FIG. 14 illustrates an example of an in-line nozzle for mixing paint, water, and any additives at an application site.

The automated drywalling system 100 can also use a spray gun 1210 that has been designed to mix the components of the paint 930 at the nozzle 1240. For example FIG. 14 illustrates an example of an in-line nozzle 1240 for mixing a coating material (e.g. paint 930, joint compound 630, adhesive, or the like) with water, and any additives at the application site. The nozzle 1240 or other cartridge or packet can be detachable in some examples to be cleaned or to be disposable.

Paint lines 428, a nozzle 1240, a pump, or the like, can be instrumented with sensors to measure flow rate, pressure and other desirable parameters. Pressure sensors can be used to monitor the pressure along a paint line 428 enabling the detection of changes in the pressure, flow rate, as well as the detection of clogs. In some examples, an orifice plate may be used to measure the flow rate through the paint system in combination with a set of pressure sensors. Other flow rate sensors can include, but are not limited to a rotameter, spring and piston flow meter, ultrasonic flow meter, turbine meter, paddlewheel meter, variable area meter, positive displacement, vortex meter, pitot tube or differential pressure meters, or magnetic meters for conductive coatings. Detecting a change in flow, pressure in the paint line 428, or reaction force at the end effector 160 (e.g. at a spray gun 1210) can be used to determine that a clog has occurred. The spray gun 1210 can produce a reaction force when spraying so if that reaction force changes the system 100 can identify that the paint spray 1250 has changed, which can be indicative of a clog or other issue.

Figure 15:
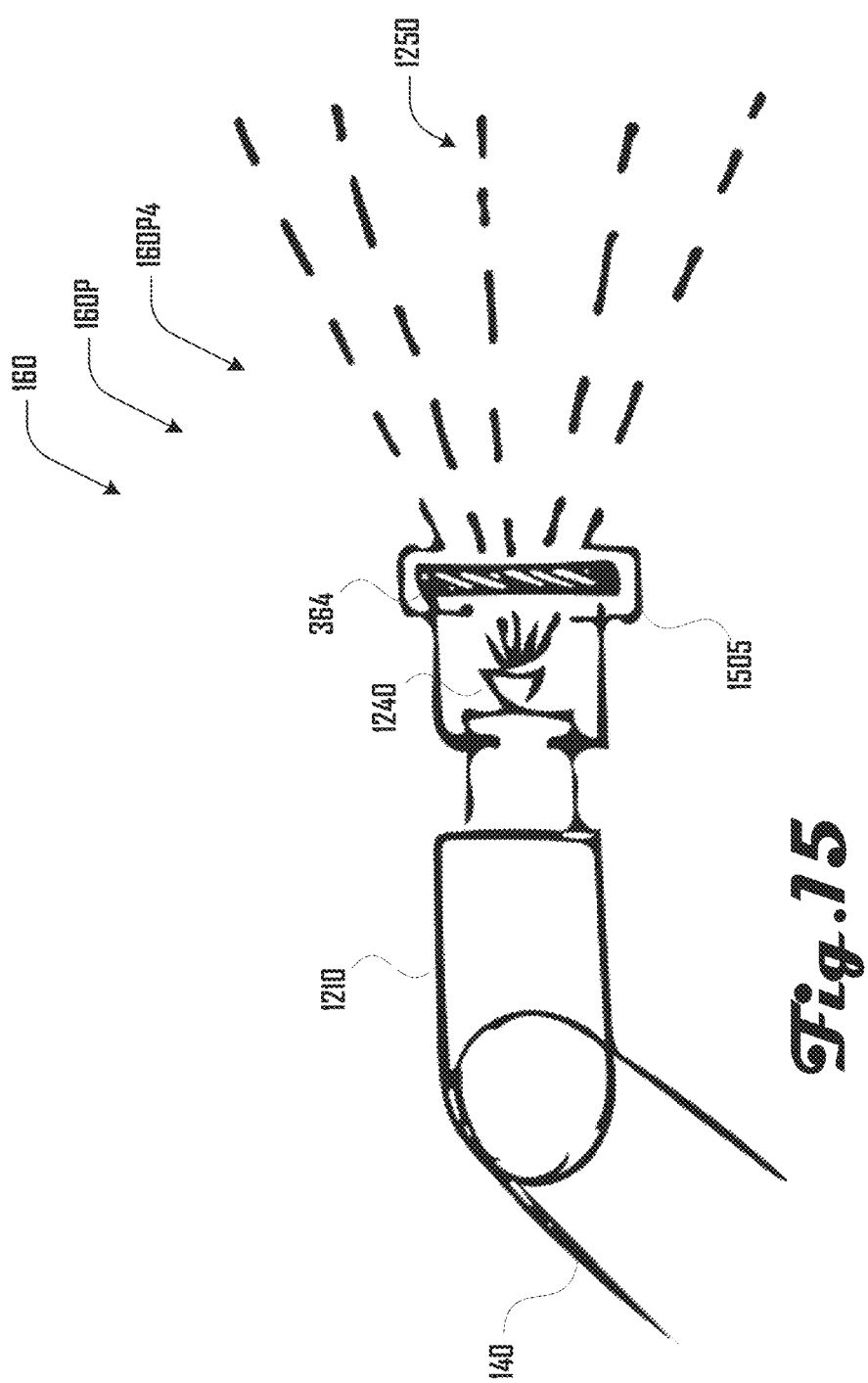

A pattern of the paint spray 1250 can also be monitored to detect clogs or wear of the nozzle 1240. For example, FIG. 15 illustrates an example embodiment 160P4 of a painting end effector 160P that includes a spray pattern detection mechanism 1505, in which a vision system 364 can be used to monitor the pattern of paint spray 1250 coming out of the nozzle 1240 to detect clogs, nozzle wear, low pressure, or other problems with the spray gun 1210 or related system such as paint lines 428, paint source 426 or the like.

In some examples, the stream of paint spray 1250 can be monitored or the pattern of paint spray 1250 on a target wall can be monitored. The stream of paint spray 1250 and/or pattern of paint spray 1250 can be monitored using vision sensors 364, which can include any suitable vision system, including but not limited to thermal sensors, moisture sensors, capacitance sensors, or the like.

In one embodiment, a camera can be placed next to the stream of paint spray 1250 so that the profile of the paint spray 1250 is captured. Image processing can be used to identify when the shape of the stream of paint spray 1250 has changed. In another embodiment, a laser curtain may be placed across the stream of paint spray 1250, and if the flow is interrupted along any part of the fan or bell, the laser would complete its path and be detected by a sensor on the other side of the stream of paint spray 1250.

A mixer, pump, paint lines 428, and nozzle 1240, and other suitable elements can be fitted with filters which can be used to catch debris or particles that may clog the nozzle 1240 or paint lines 428. The filters can be placed an inlet of the pump, outlet and inlet of the mixer, directly before the paint line 428, directly before the nozzle 1240, or any point along or within the painting system. The automated drywalling system 100 can monitor the pressure before and after the filters to detect when the filters need to be changed. Flow rate sensors can also be used to detect a clogged filter. The automated drywall system 100 can reverse its flow to clear clogs from the paint line 428, nozzle 1240, filters, or other components.

Figure 16:
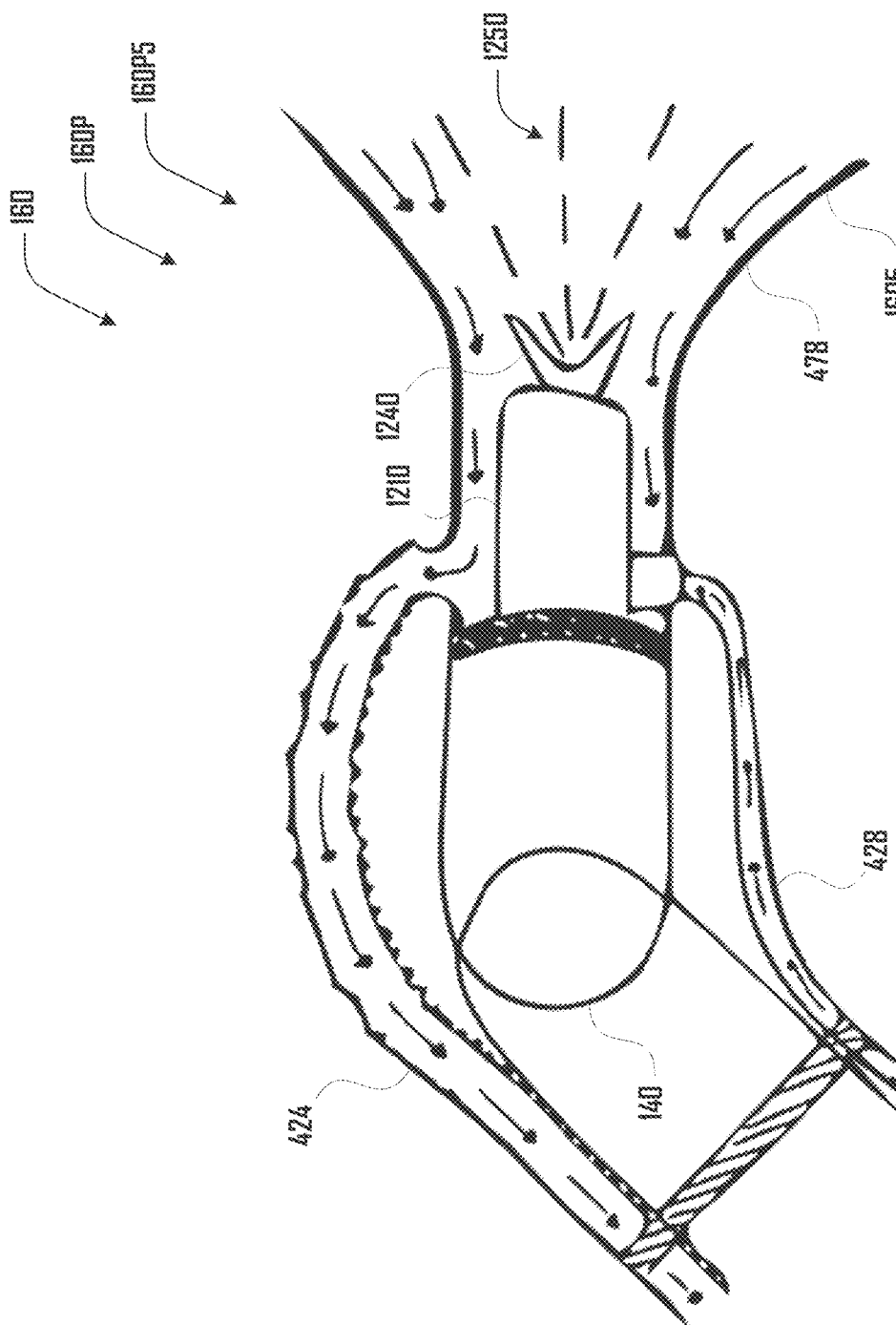
FIG. 16 illustrates an example embodiment of a painting end effector that comprises a vacuum system that includes a vacuum hood disposed around an end and nozzle of a spray gun to capture overspray.

The spray gun 1210 or other painting end effector 160P can also include a vacuum system 478, spray guards, or the like, that can be used to minimize overspray or fumes and reduce the amount of excess joint paint 930 in the air. For example, FIG. 16 illustrates an example embodiment 160P5 of a painting end effector 160P that comprises a vacuum system 478 that includes a vacuum hood 1605 disposed around the end and nozzle 1640 of a spray gun 1610 to capture overspray or fumes. The vacuum hood 1605 can surround the spray gun 1210 and can include an adjustable vacuum setting. The vacuum hood 1605 can be coupled to the vacuum line 424, which is connected to the vacuum source 422 to provide a vacuum to the vacuum hood 1605.

Figure 17:
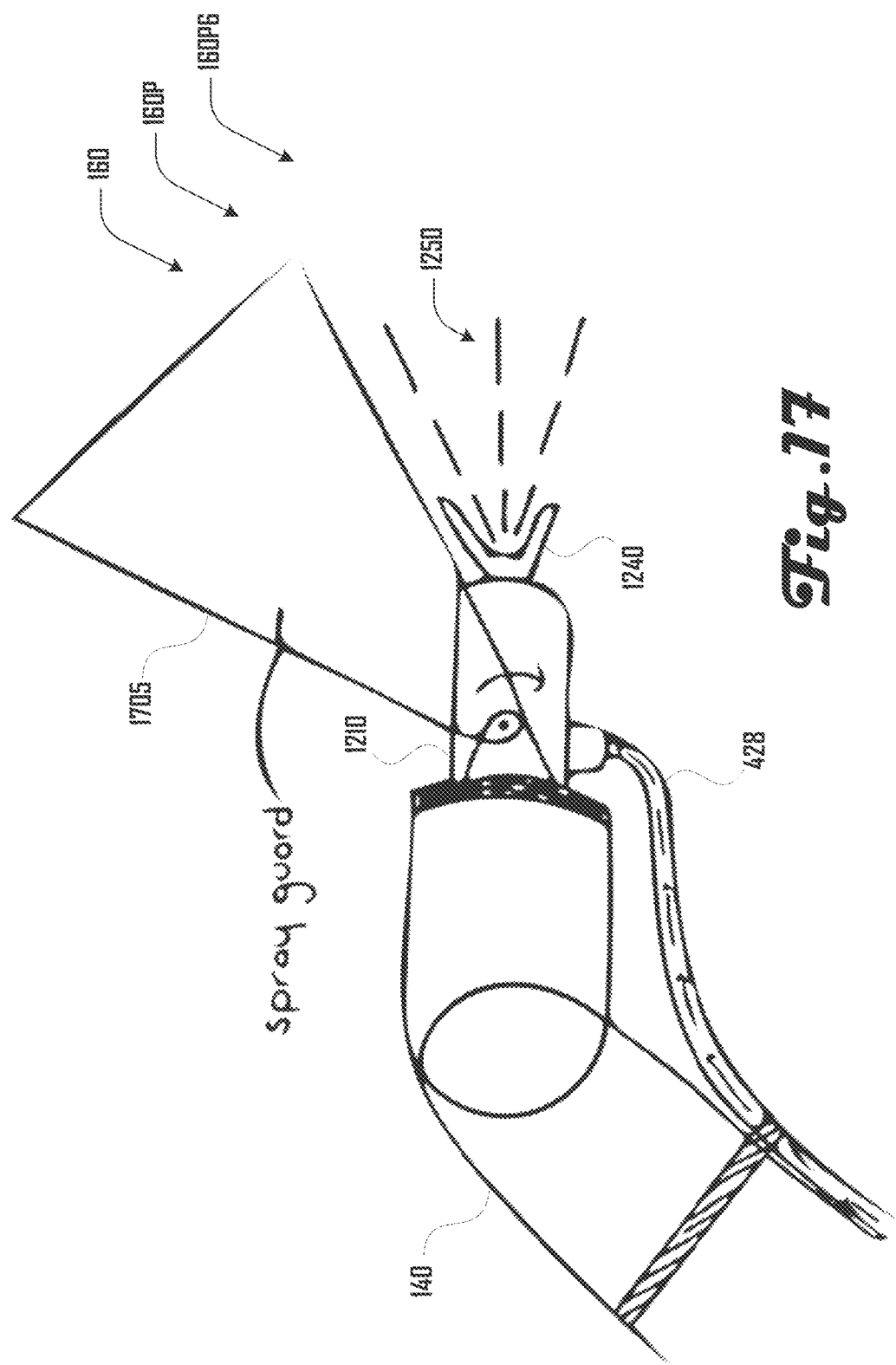
FIG. 17 illustrates an example embodiment of a painting end effector that comprises a spray guard that partially extends about and past the face of the nozzle of the spray gun.

FIG. 17 illustrates an example embodiment 160P6 of a painting end effector 160P that comprises a spray guard 1705 that partially extends about and past the face of the nozzle 1260 of the spray gun 1210. In this example, the spray guard 1705 is shown being generally triangular and fanning out from where the spray guard is coupled to the end effector 160M. In some examples, the spray guard 1750 can be selectively deployed by the system 100 or a user to prevent overspray onto an undesired surface. The spray guard 1705 can be deployed in various suitable ways, including but not limited to, via a servo, pneumatic cylinder, solenoid, or other electromechanical actuator, which can rotate or otherwise deploy the spray guard 1705 into place.

In various embodiments, a painting end effector 160P can comprise one or both of a vacuum system 478 and spray guard 1705 of various suitable configurations. The guard 1705 and/or vacuum system 478 can be deployed when the automated drywall system 100 is spraying near another surface or a feature. The spray guards 1705 and/or vacuum systems such as a vacuum hood 1605 can be retracted using a linear actuator, solenoid, air cylinder, or other suitable electromechanical actuator. In some embodiments, a spray guard 1705 can also be mounted on a rotary stage such that the spray guard 1705 can be rotated into place next to the sprayer 1210 by actuating the motor or servo. Accordingly, in some examples, the position of the spray guard about a circumference of the spray gun 1210 can be selected by the system 100 and/or a user.

In some embodiments, paint (or other coating material) can be applied by the automated drywalling system 100 via a roller, brush, or the like, which can be part of a painting end effector 160P. The paint or coating can be delivered to the end effector 160 (e.g., via paint lines 428 and paint source 426) or such a paint or coating can be sprayed directly onto the wall and back-rolled with an end effector 160. The paint can be back-rolled to facilitate blending of subsequent work. The roller or brush can be disposable or reusable. The end effector 160 can utilize the surrounding surfaces as datums, and in some examples a roller, wheel, blade, or the like can be pushed in contact with the datum surface for reference. These contact points can extend away from the paint application zone to enable the use of datums away from the defect or joint. The end effector 160 can control the position of the contact points such that the correct or optimal datum surface is used. The force and pressure on the contact points can also be controlled. Force can be directly measured or estimated by monitoring the deflection of the mounting structure.

Painting or coating tools can be mounted in series with a structure that limits, sets, or controls the amount of force applied on the surface. The structure can limit, set or control only the normal force applied on the surface by the blades, rollers, trowels or it can also limit, set or control forces applied by the tools along the target surface as well as torques applied. Blades or rollers can be mounted on an air bag, air shock, air cylinder, air bellows, or the like, with a fixed or variable pressure setting. The pressure and the normal area of the pressure vessel can set the amount of forces applied by the tool on the surface. A blade or roller can also be mounted on a spring, tunable spring, or shock in order to set, limit or control the forces applied on the surface. The forces can also be set, limited, or controlled using a pressure-controlled hydraulic system including a cylinder, bellows, reservoir, or the like. In one embodiment, a short-stroke low-mass end effector linear actuator mechanism can be used for fast tracking of surface contours and constant normal force. In embodiments with more than one blade or roller, tools can be mounted on a single force-limiting structure or each head or multiple tools can be mounted on separate structures. Mounting the tools or group of tools on separate structures can allow for the applied forces and moments to be set, limited, or controlled separately.

Painting or coating tools can include sensors 366 and/or a vision system 364 to ensure the desired orientation of the blades or rollers relative to the wall. For example, one application includes ensuring planarity of the tool to the wall; however, the mechanism may also set the blade or roller to a specific target angle relative to the surface. The planarity may be established by utilizing the vision system 364 to detect the plane of the surface and then match the tool position using the degrees of freedom of the system 100. The planarity may also be established by utilizing one or more sensors 366 at the end effector 160 (e.g., a set of proximity, range, or contact sensors to establish the position of a tool head relative to a wall). Blade or roller orientation can be controlled directly by setting the joint angles of the robotic arm 140, by a powered gimbal or joint at the end effector 160, and/or by a passive gimbal that allows the tool to tip and tilt relative to the end of the robotic arm 140. A passive gimbal can enable the contact tool to follow the plane of a target surface despite errors in the position of the system 100.

In another embodiment, the position of the contact may be controlled through the active gimbal using feedback from one or more of sensors 366, 346, 326 and/or vision systems 364, 324 that can establish the relative orientation between blades or rollers and the surface. Powered or passive gimbals or end effector degrees of freedom can be encoded (e.g., via sensors 366) such that the orientation of the tool and/or end effector 160 is known to the system 100.

A painting end effector 160P can also utilize outriggers such as rollers to use adjacent surfaces or raised edges as datums to guide the application of paint 930 (or other suitable coating) and achieve accurate corners. These rollers may be instrumented with sensors 366 and/or a vision system 364 to measure or determine force, contact, proximity, or the like. Additionally, or alternatively, such rollers can passively make contact while the drywalling system 100 utilizes its sensors 366, 346, 326 (e.g., force and torque sensing) and/or vision systems 364, 324 to maintain a pressure or force against the datum surface. The information obtained or determined about tool orientation relative to the portions of the end effector 160, robotic arm 140 and/or base unit 120 can be used to alter the toolpath, tool parameters and/or other system configurations to ensure the coating automation system can carry out the process without running into limitations of the hardware.

In both passive and active embodiments, the angular position of a gimbal or other portion of an end effector 160 can be recorded (e.g., via sensors 366 or vision system 364) to locate and establish the plane of the target surface. The angular position of the gimbal can be recorded using elements including, but not limited to encoders on the rotary axis, laser range finders, capacitance sensors, IMUs, an external vision system, sonar sensors, potentiometers, motor loads, or any combination of these.

The gimbal system can be tuned to minimize dynamic effects by using springs, dampers or a combination thereof. In some embodiments with more than one blade or roller, all tools may be mounted on a single gimbal structure or each tool or groups of tools can be mounted on separate gimbals. Mounting the blades or rollers on separate gimbals can allows for tool surface planes to be set, limited, or controlled separately. Paint application tools can be mounted on a gimbal in series with a compliant system described above that limits, sets, or controls the force applied on the surface.

Figure 18:
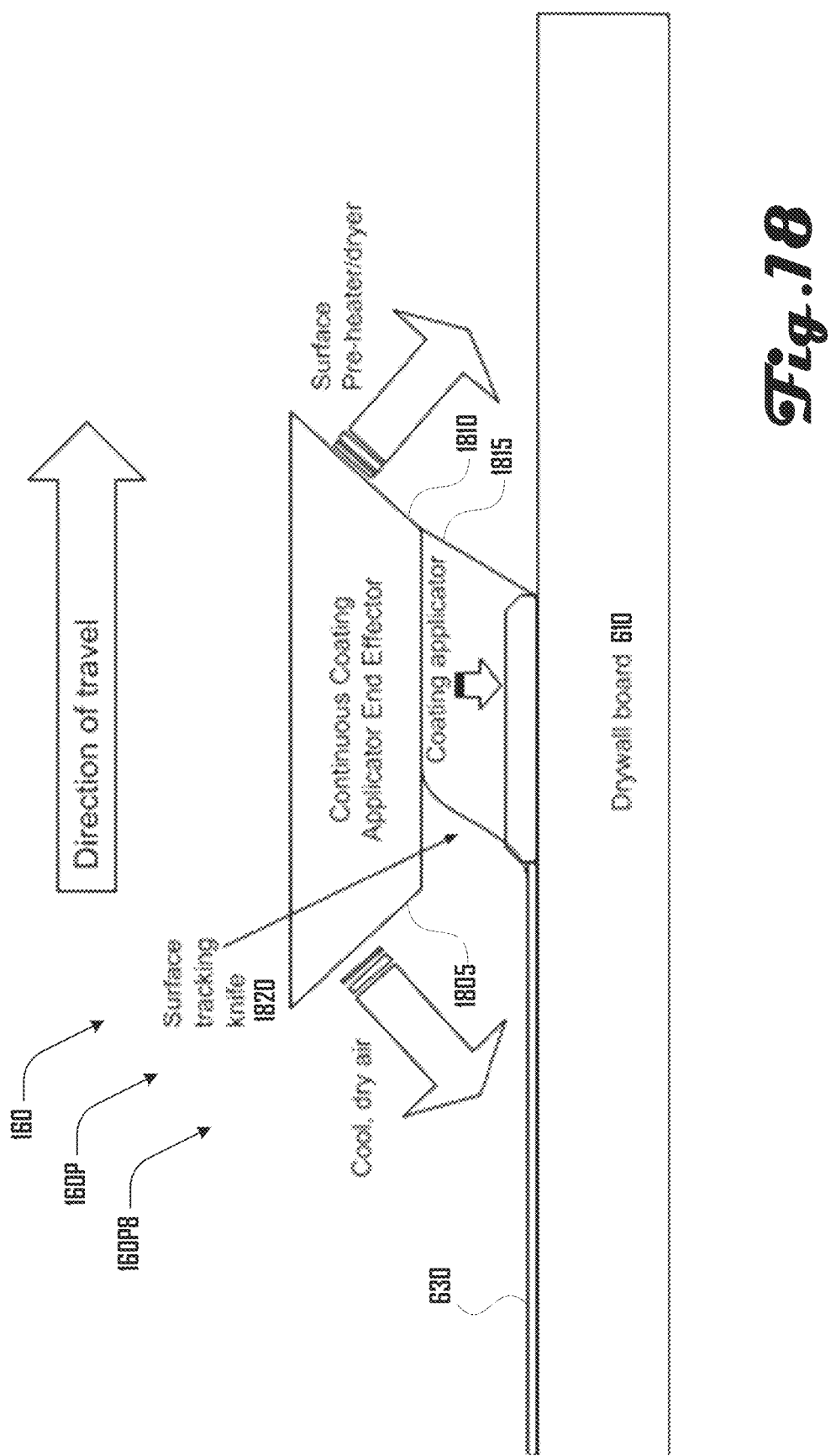
FIG. 18 illustrates an example embodiment of a painting end effector that comprises a first blower and a second blower.

In some embodiments, a painting end effector 160P can include elements including, but not limited to, a heater, curing light, blower or a combination of these. For example, FIG. 18 illustrates an example embodiment 160P8 of a painting end effector 160P that comprises a first blower 1805 and a second blower 1810. The first blower can be configured to apply cool and/or dry air to paint 930 that has been applied to the drywall board 610 by the painting end effector 160P. The second blower 1810 can be configured to apply heat and/or dry air to a surface of drywall 610 on which paint 930 will be applied. As shown in FIG. 18, the painting end effector 160P can include a paint applicator 1815 that can include a tracking knife 1820 that can be used to profile the paint 930. In various embodiments, preheating and drying the surface of drywall 610 on which paint 930 is being applied can improve the paint application process. Cooling and/or drying the applied paint 930 via the first blower 1805 can be desirable to speed the drying/curing process of the paint 930 and can improve the finish of the paint 930.

In various embodiments, elements including but not limited to a heater, fan, UV light, microwave emitter, or a combination of these elements can also be part of the automated drywalling system 100 or can be separate from the drywalling system 100. These components can be mounted on a robotic arm 140, mobile base 120, end effector 160, positioning stage 122, gantry or can be static in the room and separate from the automated drywalling system 100. A purpose of these components can be to speed up the curing, drying, or setting time of the paint 930, but can also be used to prepare the surface for the application of paint 930. An embodiment of the end effector 160 utilizes a heater that leads the paint application for preheating the surface of drywall 610 on which paint 930 will be applied by the painting end effector 160P. The paint application point can be followed by a blower which can act over the applied paint 930. The painting end effector 160P can also utilize two heaters leading and following the paint application or utilize two fans or a combination of these. The tool parameters or settings on the fan, heaters, or lights may be determined by the planning system (e.g., by the control system 322) using information from one or more of sensors 366, 346, 326 and/or vision systems 364, 324. For example, environmental sensors (e.g., temperature, humidity, and the like) and a prescribed paint composition and applied thickness can be used to determine tool parameters for environmental control tools or systems such as heaters, coolers, blowers, or the like. In another example, the painting end effector 160P can comprise a thermal imaging camera to assess the temperature of the paint 930 and calculate the moisture content of the paint 930. The automated drywalling system 100 can also have a humidity sensor, conductivity sensor and depth or thickness sensors such as laser range finders, sonar, radar, LIDAR, and the like. Toolpaths, tool parameters settings, paint composition, fan, heater, light settings, and the like can be adjusted in real-time based at least in part on the measurements, sensing or data obtained from such sensors or visions systems.

The automated drywalling system 100 can utilize additives to accelerate the setting time of paint 630 or other coating. An accelerant can be mixed into the paint 930 during preparation, added in at the nozzle 1240, applied to a coating of paint 930 after deposition, or any combination of these. The automated drywalling system 100 can utilize environmental information to decide the amount of accelerant to add and at what point in the process it should be introduced. In other words, data from one or more vision systems 324, 364 and/or sensors 326, 346, 366 to automatically modify the parameters of the composition, preparation, and application of paint 930 and/or additives for paint 930. In some examples, accelerant may be sprayed onto a coating of paint 930 after the paint 930 has been applied onto the target surface.

The automated drywalling system 100 can utilize sensors (e.g., humidity or conductivity sensors) that are mounted on a surface of drywall 610 before paint application, which can provide for tracking of the moisture content of the surface of drywall 610 and/or paint 930 applied to the surface of drywall 610. Such sensors can be mounted directly onto the target surface, may be embedded in a joint 620, or can be mounted on a coupon that is covered at the beginning of the process with the same parameters. Such sensors can be connected to a wireless communication system to send signals/data to the automated drywalling system 100. Moisture content and other information collected by such sensors can be used to control or adjust the settings on fans, blowers, heaters, curing lights, an HVAC system, or the like. The drying speed can also be used to adjust the composition of the paint 930. Monitoring the moisture content can allow the system 100 to accurately estimate the time when the next drywalling process can begin (e.g., painting, coating, or the like).

The automated drywalling system 100 can also determine when the paint 930 has set and dried by measuring the thermal conductivity of a covered seam 620 or drywall 610 using a vision system (such as a thermal imaging camera); using a sensor such as a thermometer (contact or non-contact); or by detecting differences in colors using a vision system (e.g., due to color changes that occur between wet and dry paint 930). Various measurements can be used to infer the moisture content of paint 930 by comparing a determined temperature of the paint 930 to the surrounding materials such as a sheet of drywall 610. For example, as water or other solvent evaporates from a mixture of paint 930, the temperature of the paint 930 can be lower than that of the surrounding materials. Models of the paint-drying process can also be used to estimate the time to dry or cure given a set of starting conditions and information about the environment. The environmental sensors and/or vision systems can be used in conjunction with an HVAC system or heater, air conditioner, fans, or the like to control the room conditions at a worksite. The sensor readings can automatically trigger any of these systems or a combination to maintain the room at the desired conditions for quality, reduced drying time, or comfort of the operator.

The automated drywalling system 100 can also tune the profile of a delivered coating of paint 930 (or other suitable coating) to account for overlap of a subsequent stroke of a paint gun 1210 or other painting tool. For example, paint thickness at the edges can be reduced or feathered such that the overlap region achieves the final desired thickness. This approach can also be used to increase overlap error tolerance at transition points between robot workspaces. The automated drywalling system 100 can utilize the information about the room such as location of windows and lighting fixtures to tune the painting toolpaths to achieve the most consistent finish near these features. The automated drywalling system 100 can optimize the path to minimize overlaps or breaks in the stroke near the light sources. The system 100 can also apply the coating in a criss-cross pattern to create a more even thickness or better finish. The planner system of the automated drywalling system 100 can output paths that guide the tool in this criss-cross pattern.

The automated drywalling system 100 can be instrumented with one or more vision systems 324, 364 and/or sensors 326, 346, 366 to improve operation and ensure quality. During painting, coating or wallpaper application the automated drywalling system 100 can use sensors 326, 346, 366 (e.g., force and torque sensors), which can be mounted directly on the base unit 120, robotic arm 140, and/or end effector 160, or the force and torque estimates of robotic joints can be used to apply the required force during rolling or smoothing. The sensors 326, 346, 366 can monitor only force normal to a blade, rollers or the like, or multiple axes can be monitored including torque measurements and six-axis sensing. Force sensing can be used to control the force or pressure applied by the tool of an end effector 160. A minimum force or contact reading can also be used to ensure contact is made with a target surface before the paint 930 or other coating material is allowed to flow, with target surface contact force below a certain threshold or loss of contact triggering the stop of material flow. The automated drywalling system 100 can use force information to operate in force control, where the motions and speeds of the system 100 are driven to ensure a given force is applied in the desired directions. Similarly, force sensing can be used to detect contact with an object, obstacle, or intersecting wall or ceiling. By monitoring the forces and torque on the base unit 120, robotic arm 140, and/or end effector 160, the system 100 can detect that it has made contact with the adjacent wall or ceiling and alter the toolpath accordingly. The measurements can also be used to detect accidental contact and trigger a safety operation such as stopping the system 100 or retracting away from the contact point. The base unit 120, robotic arm 140, and/or end effector 160 can also use contact or proximity sensors to detect that the end effector 160 is touching a target surface, obstacle, object, or worker, as well as detect the distance to an adjacent surface or contact with that surface. The force, contact, displacement, or proximity sensors can be mounted on outriggers from the end effector to sense obstacles, objects, or adjacent surfaces ahead of the tool. The system 100 can detect, follow, and use adjacent walls as datums to guide the coating application and achieve accurate corners or to guide the tool during accent painting. For example, in some embodiments, the end effector 160 can comprise a guiding element configured to engage a target surface, adjacent walls, or the like, to allow the end effector 160 to be guided in painting the target surface. For example, such a guiding element can include an arm extending from the end effector 160, with the arm having a roller at the end of the arm configured to engage the target surface or portion of a wall assembly as a painting guide.

The base unit 120, robotic arm 140 and/or end effector 160 can utilize multiple control strategies to complete various tasks. Position control can be used to command the system 100 to follow a trajectory given speed, acceleration, and jerk constraints. The system 100 can be controlled at the joint level by giving commands to the joints to achieve the desired robot state and tool position, or the control can be done at a higher level allowing a user or program to control end effector position and orientation. The system 100 can be controlled in task space where the system 100 controls a tool relative to the task. This approach can focus on achieving a desired tool position, orientation, speed, or the like, relative to the target surface rather than on each joint reaching its target goal. The system 100 can utilize force control to control the force applied to the target surface, an obstacle, adjacent surfaces, objects and so on. The applied force can be controlled in a single or multiple axes. Hybrid control modes can also be used. For example, the system 100 can be commanded to achieve a given position as long as a given force is not exceeded.

The one or both of the vision systems 324, 364 can be used to capture where and how paint 930 or other coating has been applied. By monitoring the spray pattern applied on the wall the system 100 can detect clogs, nozzle or blade wear, or other problems. In one example, a thermal camera can be used to detect the applied paint 930, which can be at a different temperature than the target material. The paint's temperature can be controlled to facilitate detection. Monitoring the paint temperature can also give information on the moisture content of the paint 930. The color can change as the paint 930 dries, which can be detected via vision systems 324, 364. Sensing such as capacitance, radar, resistance, humidity, conductivity, sonar measurements, or any combination of these can also be used to establish the thickness of paint 930. Lights can be mounted on the system 100 or externally to illuminate the surface enabling the detection of coated surfaces, high and low points, tool marks, coating roughness, orange peel, and defects using one or both of vision systems 324, 364.

The system 100 can monitor the coverage achieved by the end effector 160 and update tool paths and tool parameters to ensure the desired coating profile is being applied. For example, the system 100 can dynamically tune a sprayer fan and/or bell or other parameters of a nozzle 1240 until the paint spray pattern matches the desired shape, thickness, size. The system 100 can also move the sprayer 1210 closer or farther away from the target surface to change the spray pattern. The system 100 can also tune the material flow rate, pressure, spray tool speed, or the like, to achieve a desired thickness. The toolpaths and/or tool parameters can also be updated to ensure that the correct overlap is being achieved.

The system 100 can also utilize a feedback mechanism for communicating contact, forces, gimbal displacement information, tool orientation, motor loads, humidity and temperature readings, and/or measurements of the applied paint 930, to system 100 (e.g., to the control system 322) for the purpose of real time updating of the tool paths and tool parameters for improving finish of paint 930. The system 100 can use tool position and orientation, captured surface conditions, and models to update the robotic toolpaths to ensure that a desired position and/or contact is maintained during application of paint 930.

The system 100 can also determine areas that need another application of paint 930, rework using automated drywalling system 100, or rework to be done manually by the user. The user can also use a user interface of the system 100 to indicate areas that the user has identified as needing rework or need an additional coat. The system 100 can use this input along with other information about the previous work to create a new toolpath. Both user and system feedback can be fed into a machine learning algorithm to create a better model for coating future surfaces given a set of initial conditions.

The automated drywalling system 100 can utilize a user interface to enable the worker to control, program, debug, plan, and setup the system 100. The user interface can be used to give the user information about all the steps that must be taken to setup the system 100. Each step can be checked off when complete and the user can request more information on each step. The workspace of the system 100 can be shown overlaid on a camera feed or projected onto the target surface to help the user position the end effector 160, robotic arm 140 and/or mobile base unit 120. The workspace can be projected using lights or lasers. The system 100 can also automatically perform certain steps and the user interface can report the progress of each step, as well as give guidance to the steps the user can follow to perform a task. The user interface can be used to setup the system 100 and run any calibration routines required. The interface can also be used to plan a job including detecting walls, user definitions of path parameters or the path itself, auto generation of the tool path, user input of tool parameters, and automatically optimized tool parameters given a set of user inputs.

The user interface can be a graphical user interface and include a 2D or 3D representation of the worksite and workspace. The representation can include camera feeds as well as computer models and reconstructions created using sensor data. The interface can overlay paths, quality visuals, progress, robot models, and the like, over camera or workspace models. As the task is completed the path can be highlighted in different colors or with different style lines to indicate completion, quality achieved, and problem areas among others.

Any problems, issues, or bugs can be reported in the user interface. Lights on the end effector 160, mobile base 120 and/or robotic arm 140 as well as sounds can also be used to indicate problems such as movement of the end effector 160, base unit 120 and/or robotic arm 140; that work is in progress; that the system 100 is on or off; that the toolpath is running or paused; that the system 100 needs attention or refill of materials; and any other indicators of the system state. The user interface can also display information on the progress, task and tool parameters, and quality metrics of the task being performed. Environmental conditions can also be displayed and recorded by the interface. The system 100 can indicate to the user what steps to take to correct or improve conditions including air quality, temperature and humidity. If the system 100 detects unsuitable or unsafe conditions, it can display a message warning the user and providing guidance on next steps. The system 100 can use an optimization to find what parameters could be used to improve the process, including reducing work time, increasing quality, and minimizing material usage among others. The user interface can also create reports on the tasks executed, quality metrics, environmental conditions, completion, and performance logs. Information can include robot workspace, tool paths, progress, sequence of approach, application rates and thicknesses, spray pressures and flow rates, forces applied by the tool, coverage record, path speed, tracking error, time to complete the task, tool time, setup time, vacuum waste material collected, cleaning time. The user interface can also display on filter conditions, and the system 100 can trigger an alarm or instruction when the filter needs to be replaced or cleaned.

The user can interface with the system 100 using a computer, tablet, touch screen, mobile device, pendant, joystick, controller, or buttons directly on the system 100. The worker can also position and train the robotic arm 140 and/or end effector 160 by directly moving joints of the robotic arm 140 or end effector 160. The user interface, controller, or buttons can be used to record positions as well as change the control mode and task.

An augmented reality system can be used to show the worker a toolpath plan generated by the system 100, instructions, original BIM or plan, or a combination of these. The augmented reality can be displayed using a headset, smart goggles, projections, or the like. The worker can be shown areas that require manual coating application. The user can also overlay the location of studs, framing, pipes, ducts, and electrical systems behind the board to facilitate paint application. Painting tools, both manual and automated, can be tracked in the map using tags, IMUs, or other sensors and a warning can be given to the operator if an attempt is made to apply paint 930 in an erroneous position or under the wrong tool settings. The system 100 or tools can also utilize radar, sonar, thermal imaging, and the like, to establish what is behind the substrate.

The automated drywalling system 100 can also produce a visualization, paths, or instructions or a combination of these to guide the user in completing manual work. The visualization can include 2D or 3D maps marking the areas of work with labels. The visualization system can also include a projection of the plan onto the target surface that can be done with a laser system, projector, or through augmented reality headsets or goggles worn by the user.

The coating time, pressure, material flow rate, paint characteristics, and clogs can be tracked to inform when a nozzle 1210 or blade 1130 should be cleaned or changed. For example, FIG. 19 illustrates an example embodiment 160P9 of a painting end effector 160P, which comprises a nozzle cassette system 1905 where a cassette of nozzles 1240 is attached to the end of the spray gun 1210. The cassette system 1905 can be rotated (e.g., via an electromechanical system) to deliver a nozzle 1240 to the spray gun 1210 for use.

FIG. 20 illustrates another example embodiment 160P10 of a painting end effector 160P that comprises of a nozzle rotating system 2005 that can be part of a spray gun 1210. In this example, the system 100 can utilize an actuator assembly 2010 (e.g., a servo or other electromechanical actuator) to rotate (e.g., 180 degrees) a portion 2015 of the nozzle 1210 allowing for paint 930 to go through the nozzle portion 2015 in reverse helping clear out clogs.

In various embodiments, nozzle or blade wear models can also take as an input the type and characteristics of paint 930 applied and the conditions under which such paint 930 was applied. One or more vision systems 364, 324 of the system 100 can be used to detect finish, tool pattern and establish if the nozzle 1240 or blade 1130 needs to be changed, rotated, cleaned or otherwise modified. A user interface can display the wear on the nozzle 1240 or blade 1130 and alert the user when these need to be changed. A painting end effector 160P can also include a mechanism to automatically replace or clean the nozzle 1240 or portions thereof. One embodiment (e.g., FIG. 19) can use a cassette with replacement nozzles 1240 that can be rotated into place. The sprayer 1210 can also have a mechanism 2005 to rotate the nozzle or portion thereof (e.g. a tip or feeding tube) to clear a clog (e.g., FIG. 20). The nozzle clearing or replacement can be run automatically by the system 100 without any human intervention or as a collaboration between the system 100 and the user.

The system 100 can generate reports and interface with other software platforms including BIM packages. Reports can be created that can be used for inspection and certification. A report can be customized to provide the information required to pass a standard, test, or certification. The reporting system can also provide a live update of the current task progress and live camera feed. This information can be used to help track asset performance and work progression. The data can be reported to a BIM system or other software to facilitate planning of other trades, next steps, or schedule inspections or other tasks. The reports can include full maps of the paint 930 applied and tool and path parameters utilized to complete the task. Further images or video can be recorded to facilitate quality checks or for tracking of issues. The system 100 can record parameters used to complete the task which can be fed to a machine learning software to enable the system 100 to learn from past work. The reports can also be used to optimize workflow and scheduling. The system's optimization function can be updated to meet the desired needs including minimizing task time, completion of the task in a part of the worksite to allow other trades to come in, minimizing cost, optimal use of assets and workforce, among others. The system's reports can also include information on environmental conditions and how the process was changed given the conditions.

The system 100 can create a report that shows the process parameters that were used to cover the surface as well as the order of operations. The report can include BIM, 3D and 2D maps or plans, images, and/or video. The maps provided by the system 100 can be used to facilitate repairs and maintenance by providing the customer with the location of components behind the wall as well as the location of seams to facilitate the removal of panels or boards.

The updated room models that reflect the as built conditions and measurements can be exported for use in sanding the walls or for certification of quality at delivery. A complete map of the thickness of the paint 930 applied with or without shrinking can be fed into the system 100 or a separate automated sanding system which can plan tool paths and parameters desired to achieve the desired finish by sanding. The system 100 can work in conjunction with a larger system that plans the full process from mapping a room, to cutting and hanging the drywall to finishing and painting of the surfaces. This system 100 can be used for coating surfaces with any suitable material, including but not limited to, joint compound 630, plaster, stucco, cement, paint 930, polymer coating, lacquers, varnishes, or any combination of these. The system 100 can apply the coatings on any suitable substrate, including but not limited to, drywall, boards, lath, mesh, or other substrates. The system 100 can also be used to apply other coverings such as wallpaper, polymer films, or the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method, the method comprising:
transmitting a first signal to a perception system of a painting system to scan one or more surfaces of a wall assembly;
receiving sensor data from the perception system;
determining a relative position of the painting system and the one or more surfaces of the wall assembly based on the scanning; and
transmitting a second signal to a robotic arm of the painting system to move the robotic arm to apply a spray of paint from a painting end effector of the painting system to the one or more surfaces of the wall assembly based at least in part on the relative position, wherein the painting system creates a feathered paint edge by reducing an amount of the paint applied by the painting end effector at an edge of a first region of the one or more surfaces;

receiving further sensor data comprising paint flow rate data; and transmitting a third signal to cause a flow of the paint through the painting end effector to reverse to clear a clog based on detecting a change in the further sensor data.

2. The method of claim 1, further comprising:

transmitting a fourth signal to move the robotic arm to apply the spray of the paint from the painting end effector to the feathered paint edge and a second region of the one or more surfaces, wherein the second region is adjacent to the first region and the painting system blends the paint across the first region and the second region by reducing the amount of the paint applied by the painting end effector at the feathered paint edge.

3. The method of claim 1, further comprising:

obtaining, from the perception system, paint application data identifying at least one of: one or more painted regions of the one or more surfaces, and one or more unpainted regions of the one or more surfaces.

4. The method of claim 1, further comprising:

transmitting a fourth signal to a movement system to move the painting system to a location adjacent to the one or more surfaces of the wall assembly, wherein the movement compensates for error in the location relative to a target location.

5. The method of claim 1, further comprising:

generating a map of the one or more surfaces of the wall assembly based at least in part on the scanning, wherein the determining the relative position of the painting system and the one or more surfaces of the wall assembly comprises determining a location of the painting system within the map.

6. The method of claim 1, further comprising:

detecting a location of an object relative to the painting system; and maintaining safety of the object by triggering a safety operation of the painting system based on the location of the object.

7. The method of claim 1, further comprising:

initiating an application of the paint to the one or more surfaces of the wall assembly based on data obtained while the painting system was applying joint compound to one or more joints on the one or more surfaces of the wall assembly.

8. The method of claim 1, further comprising:

transmitting a fourth signal to the robotic arm to move the robotic arm to blend the paint across adjacent painted regions by rolling the adjacent painted regions with a paint roller while the paint is wet.

9. A method, the method comprising:

transmitting a first signal to a perception system of a painting system to scan one or more surfaces of a wall assembly;

receiving sensor data from the perception system;

determining a relative position of the painting system and the one or more surfaces of the wall assembly based on the scanning;

transmitting a second signal to a robotic arm of the painting system to move the robotic arm to apply a spray of paint from a painting end effector of the painting system to the one or more surfaces of the wall assembly based at least in part on the relative position, wherein the painting system creates a feathered paint edge by reducing an amount of the paint applied by the painting end effector at an edge of a first region of the one or more surfaces;

receiving further sensor data comprising pressure data; and transmitting a third signal to cause a flow of the paint through the painting end effector to reverse to clear a clog based on detecting a change in the further sensor data.

10. The method of claim 9, further comprising:

transmitting a fourth signal to move the robotic arm to apply the spray of the paint from the painting end effector to the feathered paint edge and a second region of the one or more surfaces, wherein the second region is adjacent to the first region and the painting system blends the paint across the first region and the second region by reducing the amount of the paint applied by the painting end effector at the feathered paint edge.

11. The method of claim 9, further comprising:

obtaining, from the perception system, paint application data identifying at least one of: one or more painted regions of the one or more surfaces, and one or more unpainted regions of the one or more surfaces.

12. The method of claim 9, further comprising:

transmitting a fourth signal to a movement system to move the painting system to a location adjacent to the one or more surfaces of the wall assembly, wherein the movement compensates for error in the location relative to a target location.

13. The method of claim 9, further comprising:

generating a map of the one or more surfaces of the wall assembly based at least in part on the scanning, wherein the determining the relative position of the painting system and the one or more surfaces of the wall assembly comprises determining a location of the painting system within the map.

14. The method of claim 9, further comprising:

detecting a location of an object relative to the painting system; and maintaining safety of the object by triggering a safety operation of the painting system based on the location of the object.

15. The method of claim 9, further comprising:

initiating an application of the paint to the one or more surfaces of the wall assembly based on data obtained while the painting system was applying joint compound to one or more joints on the one or more surfaces of the wall assembly.

16. A method, the method comprising:

transmitting a first signal to a perception system of a painting system to scan one or more surfaces of a wall assembly;

receiving sensor data from the perception system;

determining a relative position of the painting system and the one or more surfaces of the wall assembly based on the scanning;

transmitting a second signal to a robotic arm of the painting system to move the robotic arm to apply a spray of paint from a painting end effector of the painting system to the one or more surfaces of the wall assembly based at least in part on the relative position, wherein the painting system creates a feathered paint edge by reducing an amount of the paint applied by the painting end effector at an edge of a first region of the one or more surfaces;

receiving further sensor data comprising image data; and transmitting a third signal to cause a flow of the paint through the painting end effector to reverse to clear a clog based on detecting a change in the further sensor data.

17. The method of claim 16, further comprising:
transmitting a fourth signal to move the robotic arm to apply the spray of the paint from the painting end effector to the feathered paint edge and a second region of the one or more surfaces, wherein the second region is adjacent to the first region and the painting system blends the paint across the first region and the second region by reducing the amount of the paint applied by the painting end effector at the feathered paint edge.

18. The method of claim 16, further comprising:
generating a map of the one or more surfaces of the wall assembly based at least in part on the scanning, wherein the determining the relative position of the painting system and the one or more surfaces of the wall assembly comprises determining a location of the painting system within the map.

19. The method of claim 16, further comprising:
detecting a location of an object relative to the painting system; and
maintaining safety of the object by triggering a safety operation of the painting system based on the location of the object.

20. The method of claim 16, further comprising:
initiating an application of the paint to the one or more surfaces of the wall assembly based on data obtained while the painting system was applying joint compound to one or more joints on the one or more surfaces of the wall assembly.

\* \* \* \* \*